US012035272B2

(12) United States Patent
Manolakos et al.

(10) Patent No.: US 12,035,272 B2
(45) Date of Patent: *Jul. 9, 2024

(54) GROUP DELAY TIMING ACCURACY FOR POSITIONING IN NEW RADIO

(71) Applicant: QUALCOMM Incorporated, San Diego, CA (US)

(72) Inventors: Alexandros Manolakos, Escondido, CA (US); Sony Akkarakaran, Poway, CA (US); Alexander Dorosenco, El Cajon, CA (US); Joseph Binamira Soriaga, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,269

(22) Filed: Apr. 18, 2023

(65) Prior Publication Data

US 2023/0254808 A1 Aug. 10, 2023

Related U.S. Application Data

(63) Continuation of application No. 16/862,113, filed on Apr. 29, 2020.

(30) Foreign Application Priority Data

May 2, 2019 (GR) .............................. 20190100189

(51) Int. Cl.
*H04W 64/00* (2009.01)
*H04L 5/00* (2006.01)
(Continued)

(52) U.S. Cl.
CPC ......... *H04W 64/003* (2013.01); *H04L 5/0051* (2013.01); *H04W 24/10* (2013.01); *H04W 72/1273* (2013.01)

(58) Field of Classification Search
None
See application file for complete search history.

(56) References Cited

U.S. PATENT DOCUMENTS 6,486,831 B1 11/2002 Martorana et al.
6,747,594 B2 6/2004 Lindskog et al.
(Continued)

FOREIGN PATENT DOCUMENTS

CN 104166343 B 8/2017
CN 107734635 B 6/2021
(Continued)

OTHER PUBLICATIONS

Apple: "Signalling Impacts of RAN1 Agreements on Accuracy Enhancements", 3GPP TSG-RAN WG2 Meeting #116bis-e, R2-2201104, 3rd Generation Partnership Project, Mobile Competence Centre, 650, Route Des Lucioles, F-06921 Sophia-Antipolis Cedex, France, vol. RAN WG2, No. Electronic, Jan. 17, 2021-Jan. 25, 2021, Jan. 11, 2022, XP052094209, 5 pages, pp. 1-4.
(Continued)

*Primary Examiner* — Scott M Sciacca
(74) *Attorney, Agent, or Firm* — Holland & Hart LLP

(57) ABSTRACT

Methods, systems, and devices for wireless communications are described. A user equipment (UE) may receive a configuration signal, the configuration signal indicating a configuration for a positioning reference signal. The UE may determine one or more properties associated with the positioning reference signal based on the configuration signal. The UE may determine an accuracy level associated with one or more timing measurements based on the one or more (Continued)

properties associated with the positioning reference signal, and transmit a measurement report associated with the positioning reference signal to a base station. In some examples, the measurement report may be related to the accuracy level associated with the one or more timing measurements.

30 Claims, 16 Drawing Sheets

(51) Int. Cl.
    *H04W 24/10*     (2009.01)
    *H04W 72/12*     (2023.01)
    *H04W 72/1273*     (2023.01)

(56) References Cited

U.S. PATENT DOCUMENTS

| | | |
|---|---|---|
| 7,116,632 B2 | 10/2006 | Alapuranen |
| 7,848,397 B2 | 12/2010 | Small |
| 7,881,684 B2 | 2/2011 | Nakagawa et al. |
| 9,020,495 B2 | 4/2015 | Kazmi et al. |
| 9,380,546 B1* | 6/2016 | Smidth ................ H04W 24/08 |
| 9,462,563 B2 | 10/2016 | Siomina et al. |
| 9,648,573 B2 | 5/2017 | Siomina et al. |
| 9,702,965 B2 | 7/2017 | Horvat et al. |
| 10,218,471 B1 | 2/2019 | Kumar et al. |
| 10,334,554 B2 | 6/2019 | Lee et al. |
| 10,390,324 B2 | 8/2019 | Kazmi et al. |
| 11,071,159 B1 | 7/2021 | Marupaduga |
| 11,082,104 B2 | 8/2021 | Cai et al. |
| 11,109,193 B2 | 8/2021 | Kim et al. |
| 11,197,264 B2 | 12/2021 | Hunukumbure et al. |
| 11,316,633 B2 | 4/2022 | Kim et al. |
| 11,510,174 B2 | 11/2022 | Cha et al. |
| 2013/0162470 A1 | 6/2013 | Rousu et al. |
| 2013/0185617 A1* | 7/2013 | Roh .................. H04W 4/00 370/328 |
| 2016/0119039 A1* | 4/2016 | Soliman ................ H04W 88/06 455/553.1 |
| 2016/0227516 A1 | 8/2016 | Nallampatti et al. |
| 2016/0291128 A1 | 10/2016 | Persson et al. |
| 2018/0048345 A1* | 2/2018 | Pehlke ..................... H03F 3/72 |
| 2018/0063678 A1 | 3/2018 | Zhu et al. |
| 2018/0226932 A1* | 8/2018 | Beaudin ............ H04W 52/0261 |
| 2018/0302873 A1 | 10/2018 | Kazmi et al. |
| 2019/0052996 A1 | 2/2019 | Sahai et al. |
| 2019/0141554 A1 | 5/2019 | Siomina et al. |
| 2019/0141555 A1 | 5/2019 | Tooher et al. |
| 2019/0223140 A1 | 7/2019 | Grossmann et al. |
| 2019/0320403 A1 | 10/2019 | Zhang et al. |
| 2020/0137607 A1 | 4/2020 | Akkarakaran et al. |
| 2020/0178036 A1 | 6/2020 | Edge |
| 2020/0205104 A1 | 6/2020 | Akkarakaran et al. |
| 2020/0259896 A1 | 8/2020 | Sachs et al. |
| 2020/0267682 A1 | 8/2020 | Manolakos et al. |
| 2020/0296680 A1 | 9/2020 | Akkarakaran et al. |
| 2020/0314782 A1 | 10/2020 | Ruffini et al. |
| 2020/0351814 A1 | 11/2020 | Manolakos et al. |
| 2021/0014644 A1 | 1/2021 | Wu |
| 2021/0058880 A1 | 2/2021 | Ghosh et al. |
| 2021/0091905 A1 | 3/2021 | Si et al. |
| 2021/0119746 A1 | 4/2021 | Manolakos et al. |
| 2021/0120522 A1 | 4/2021 | Kim et al. |
| 2021/0219254 A1 | 7/2021 | Wang et al. |
| 2021/0250892 A1 | 8/2021 | Kim |
| 2021/0376940 A1 | 12/2021 | Huang et al. |
| 2021/0377698 A1 | 12/2021 | Manolakos et al. |
| 2021/0400755 A1 | 12/2021 | Van Der Velde et al. |
| 2022/0038231 A1 | 2/2022 | Tao et al. |
| 2022/0232345 A1 | 7/2022 | Bao et al. |
| 2023/0184871 A1 | 6/2023 | Ernström et al. |
| 2023/0292280 A1 | 9/2023 | Manolakos et al. |
| 2023/0328567 A1 | 10/2023 | Manolakos et al. |

FOREIGN PATENT DOCUMENTS

| | | |
|---|---|---|
| EP | 1158308 A2 | 11/2001 |
| EP | 3177088 B1 | 6/2020 |
| EP | 3911052 A1 | 11/2021 |
| WO | WO-2017078610 A1 | 5/2017 |
| WO | WO-2018206098 A1 | 11/2018 |
| WO | WO-2019157052 A2 | 8/2019 |
| WO | 2020038215 A1 | 2/2020 |
| WO | WO-2020144624 A1 | 7/2020 |
| WO | WO-2020167055 A1 | 8/2020 |
| WO | 2020204600 A2 | 10/2020 |
| WO | WO-2020222956 A1 | 11/2020 |
| WO | WO-2020229972 A1 | 11/2020 |
| WO | 2020204600 A3 | 12/2020 |
| WO | 2021063397 A1 | 4/2021 |
| WO | 2021169676 A1 | 9/2021 |
| WO | 2021187962 A1 | 9/2021 |
| WO | WO-2022081630 A1 | 4/2022 |
| WO | WO-2022258878 A1 | 12/2022 |

OTHER PUBLICATIONS

Qualcomm Incorporated: "Open Issues in Core Requirements for NR Positioning—Rx/Tx Timing Error Mitigation", 3GPP TSG-RAN WG4 Meeting #103-e, R4-2208025, 3rd Generation Partnership Project, Mobile Competence Centre, 650, Route Des Lucioles, F-06921 Sophia-Antipolis Cedex, France, vol. RAN WG4, No. Online Meeting, May 9, 2022-202205202, Apr. 5, 2022, XP052143563, 6 pages, Section 2, pp. 1-3, Section 4, p. 5.

Vivo: "Discussion on Methods for Rx/Tx Timing Delay Mitigating", 3GPP TSG RAN WG1 #104b-e, R1-2102526, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 6, 2021, XP051993130, 15 Pages, Sections 1-6.

CATT [RAN1]: "[Draft] LS on UE/TRP Tx/Rx Timing Errors", 3GPP Draft, R1-2102201, 3GPP TSG RAN WG1 Meeting #104e, 3rd Generation Partnership Project (3GPP), Mobile Competence Centre, 650, Route Des Lucioles, F-06921, Sophia-Antipolis Cedex, France, vol. RAN WG1, No. e-meeting, Jan. 25, 2021-Feb. 5, 2021, Feb. 8, 2021 (Feb. 8, 2021), XP051977763, 2 Pages.

Ericsson: "Techniques Mitigating UE Rx/Tx Timing Delays", 3GPP Draft, R1-2101754, 3GPP TSG-RAN WG1 Meeting #104-e, 3rd Generation Partnership Project (3GPP), Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 19, 2021 (Jan. 19, 2021), XP051971905, pp. 1-22.

Intel Corporation: "Mitigation of UE/gNB TX/RX Timing Errors", 3GPP TSG RAN WG1 #105e, R1-2104905, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 12, 2021, 8 Pages, XP052011123.

Qualcomm Incorporated: "Discussion on Positioning Enhancements UE Features", R1-2112250, 3GPP TSG RAN WG1 #107-e, 3rd Generation Partnership Project (3GPP), Mobile Competence Centre, 650, Route Des Lucioles, F-06921, Sophia-Antipolis Cedex, France, vol. RAN WG1, No. e-Meeting, Nov. 11, 2021-Nov. 19, 2021, Nov. 6, 2021 (Nov. 6, 2021), XP052075355, pp. 1-19.

Qualcomm Incorporated: "Enhancements on Timing Error Mitigations for Improved Accuracy", 3GPP TSG RAN WG1 #104b-e, R1-2104671, 3rd Generation Partnership Project, Mobile Competence Centre, 650, Route Des Lucioles, F-06921, Sophia-Antipolis Cedex, France, vol. RAN WG1, No. e-Meeting, May 10, 2021-May 27, 2021, May 12, 2021, XP052010922, 22 Pages, Chapter 4 Reference Devices for Measurement Calibration.

Qualcomm Incorporated: "Enhancements on Timing Error Mitigations for Improved Accuracy", 3GPP TSG RAN WG1 #104-e, R1-2101468, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, pp. 1-12, Jan. 19, 2021, XP051971633, Section 3.2

(56) References Cited

OTHER PUBLICATIONS

"Double Differential Positioning Methods—Elimination of both UE's and gNB unknow GDs", see also figure on p. 7, p. 6-9.
Qualcomm Incorporated: "Initial Evaluation of Achievable Positioning Accuracy", 3GPP Draft, 3GPP TSG RAN WG1 #101-e, R1-2004491, 3rd Generation Partnership Project (3GPP), Mobile Competence Centre, 650 Route Des Lucioles, F-06921 Sophia-Antipolis Cedex, France, vol. RAN WG1, No. e-meeting, May 25, 2020-Jun. 5, 2020, May 16, 2020 (May 16, 2020), XP051886220, 21 Pages, Section 3.
Qualcomm Incorporated: "Potential Positioning Enhancements for NR Rel-17 Positioning", 3GPP TSG RAN WG1 #103-e, R1-2008619, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 17, 2020, XP051940245, 17 Pages, Section 3.2 Frequency-domain DL/UL PRS bundling, paragraph [05.4], p. 5, 16.
Qualcomm Incorporated: "Remaining Details on UE & gNB Measurements for NR Positioning", 3GPP Draft, R1-1912975, 3GPP TSG RAN WG1 #98, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 18, 2019, Nov. 9, 2019 (Nov. 9, 2019), XP051823737, pp. 1-12, p. 1-p. 12, p. 2, p. 8, p. 10.
Qualcomm Incorporated: "Remaining Issues on Timing Error Mitigations for Improved Accuracy", 3GPP TSG RAN WG1 #106-bis-e, R1-2110187, 3rd Generation Partnership Project, Mobile Competence Centre, 650, Route Des Lucioles, F-06921, Sophia-Antipolis Cedex, France, vol. RAN WG1, No. e-Meeting, Oct. 11, 2021-Oct. 19, 2021, Oct. 2, 2021, 10 Pages, XP052059123, The whole document.
3GPP TR 22.804: "3rd Generation Partnership Project; Technical Specification Group Services and System Aspects; Study on Communication for Automation in Vertical Domains (Release 16)", 3GPP TR 22.804 V16.2.0 (Dec. 2018), https://www.3gpp.org/ftp//Specs/archive/22_series/22.804/22804-g20.zip, 196 Pages.
Ericsson: "PRS Configuration Identity Feedback for OTDOA Enhancements", 3GPP Draft, 3GPP TSG-RAN1 Meeting #97bis, R1-1705942—PRS Configuration Identity Feedback for OTDOA Enhancements, 3rd Generation Partnership Project (3GPP), Mobile Competence Centre, 650, Route Des Lucioles, F-06921 Sophia-Anti, vol. RAN WG1, No. Spokane, US, Apr. 3, 2017-Apr. 7, 2017, Apr. 2, 2017 (Apr. 2, 2017), XP051244051, pp. 1-3, Sections 1, 2.
International Preliminary Report On Patentability—PCT/US2020/030668, the International Bureau of WIPO—Geneva, Switzerland, dated Nov. 11, 2021 (192268WO).
International Search Report and Written Opinion—PCT/US2020/030668—ISAEPO—dated Oct. 1, 2020 (192268WO).
Samsung: "DL and UL Reference Signals Design for NR Positioning", 3GPP Draft, 3GPP TSG RAN WG1 #96b, R1-1904394 NR Positioning DL and UL RS Design_SS, 3rd Generation Partnership Project (3GPP), Mobile Competence Centre, 650, Route Des Lucioles, F-06921, Sophia-Antipolis Cedex, France, vol. RAN WG1, No. Xi'an, China, Apr. 8, 2019-Apr. 12, 2019, Apr. 2, 2019 (Apr. 2, 2019), XP051707199, pp. 1-15, Sections 2, 3, 4, Abstract, Section 2.2.2, 2.4.
Sivers M., et al., "LTE Positioning Accuracy Performance Evaluation", Internet of Things, Smart Spaces, and Next Generation Networks and Systems, ruSMART 2015, NEW2AN 2015, Lecture Notes in Computer Science, vol. 9247. Springer, Cham, https://doi.org/10.1007/978-3-319-23126-6_35, 14 Pages.
Spreadtrum Communications: "Discussion on DL only Based Positioning", 3GPP Draft, 3GPP TSG RAN WG1 Meeting #96, R1-1902721 Discussion on DL only Based Positioning, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600416, 5 Pages, Sections 1 and 2.
3GPP TS 37.355: "3rd Generation Partnership Project; Technical Specification Group Radio Access Network; LTE Positioning Protocol (LPP) (Release 16)", 3GPP TS 37.355, 3rd Generation Partnership Project, Mobile Competence Centre, 650, Route Des Lucioles, F-06921 Sophia-Antipolis Cedex, France, No. V16.1.0, Jul. 24, 2020 (Jul. 24, 2020), 292 p. XP051925824, Chapters 4.1.3, 6.5.1.2, Sections 5-5.3.4 and 6.4.2-6.4.3, p. 13, paragraph 1 Scope—p. 104, paragraph 6.5.1.9 OTDOA Error Elements.
Qualcomm Incorporated: "Potential Enhancements for NR Rel-17 Positioning", 3GPP TSG RAN WG1 #102-e, 3GPP Draft, R1-2006810, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), pp. 1-21, XP051918260, Proposal 11, paragraph [03.3] paragraph [4.2.2], p. 11.
ZTE: "Evaluation Assumptions for NR Positioning Enhancements", R1-2005462, 3GPP TSG RAN WG1 Meeting #102-e, e-Meeting, Aug. 17-Aug. 28, 2020, pp. 1-4.

\* cited by examiner

GROUP DELAY TIMING ACCURACY FOR POSITIONING IN NEW RADIO

CROSS REFERENCE

The present application for Patent is a continuation of U.S. patent application Ser. No. 16/862,113 by MANOLAKOS et al., entitled "GROUP DELAY TIMING ACCURACY FOR POSITIONING IN NEW RADIO," filed Apr. 29, 2020, which claims the benefit of Greece Provisional Patent Application No. 2019/0100189 by MANOLAKOS et al., entitled "GROUP DELAY TIMING ACCURACY FOR POSITIONING IN NEW RADIO," filed May 2, 2019, each of which is assigned to the assignee hereof and incorporated by reference in its entirety.

BACKGROUND

The following relates generally to wireless communications, and more specifically to group delay timing accuracy for positioning.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless communications network may implement techniques to keep track of the positioning of a UE in the wireless communications network. In some cases, the UE may transmit or receive positioning reference signals to or from base stations, which the network may use to determine the positioning of the UE. Conventional techniques to accurately perform timing measurements for a positioning reference signal are deficient, and positioning techniques in a wireless communications system can be improved.

SUMMARY

The described techniques relate to improved methods, systems, devices, and apparatuses that support group delay timing accuracy for positioning in New Radio (NR). Generally, the described techniques provide for utilizing properties of a positioning reference signal to identify an accuracy level for performing one or more timing measurements. A wireless communications system may support a configuration signal, which may be transmitted by a base station. The configuration signal may indicate a configuration for a positioning reference signal. A user equipment (UE) may receive the configuration signal and may determine one or more properties associated with the positioning reference signal based on the configuration signal. In some cases, the UE may determine an accuracy level associated with one or more timing measurements based on the one or more properties associated with the positioning reference signal. For example, the UE may determine an accuracy expected on one or more timing measurements based on one or more transmission or measurement properties. The UE may then transmit a measurement report associated with the positioning reference signal to the base station. In some examples, the measurement report may be related to the accuracy level associated with the one or more timing measurements.

A method of wireless communication, by a UE is described. The method may include receiving a configuration signal indicating a configuration for a positioning reference signal, determining one or more properties associated with the positioning reference signal based on the configuration signal, determining an accuracy level associated with one or more timing measurements based on one or more timings associated with the positioning reference signal and the one or more properties associated with the positioning reference signal, and transmitting a measurement report associated with the positioning reference signal, where the measurement report is related to the accuracy level associated with the one or more timing measurements.

An apparatus for wireless communication, by a UE is described. The apparatus may include a processor, memory in electronic communication with the processor, and instructions stored in the memory. The instructions may be executable by the processor to cause the apparatus to receive a configuration signal indicating a configuration for a positioning reference signal, determine one or more properties associated with the positioning reference signal based on the configuration signal, determine an accuracy level associated with one or more timing measurements based on one or more timings associated with the positioning reference signal and the one or more properties associated with the positioning reference signal, and transmit a measurement report associated with the positioning reference signal, where the measurement report is related to the accuracy level associated with the one or more timing measurements.

Another apparatus for wireless communication, by a UE is described. The apparatus may include means for receiving a configuration signal indicating a configuration for a positioning reference signal, determining one or more properties associated with the positioning reference signal based on the configuration signal, determining an accuracy level associated with one or more timing measurements based on one or more timings associated with the positioning reference signal and the one or more properties associated with the positioning reference signal, and transmitting a measurement report associated with the positioning reference signal, where the measurement report is related to the accuracy level associated with the one or more timing measurements.

A non-transitory computer-readable medium storing code for wireless communication, by a UE is described. The code may include instructions executable by a processor to receive a configuration signal indicating a configuration for a positioning reference signal, determine one or more properties associated with the positioning reference signal based on the configuration signal, determine an accuracy level associated with one or more timing measurements based on one or more timings associated with the positioning reference signal and the one or more properties associated with the positioning reference signal, and transmit a measurement report associated with the positioning reference signal, where the measurement report is related to the accuracy level associated with the one or more timing measurements.

Some examples of the method, apparatuses, and non-transitory computer-readable medium described herein may further include operations, features, means, or instructions for determining, based on the one or more properties associated with the positioning reference signal, an accuracy level associated with a transmission timing for a second positioning reference signal, an accuracy level associated with a reception timing for the positioning reference signal, an accuracy level associated with a time difference between a reception of the positioning reference signal and a transmission of the second positioning reference signal, or any combination thereof.

Some examples of the method, apparatuses, and non-transitory computer-readable medium described herein may further include operations, features, means, or instructions for one or more measurement gaps, one or more guard periods associated with a scheduled transmission of the positioning reference signal, or a combination thereof, where the one or more measurement gaps and the one or more guard periods may be scheduled before the positioning reference signal, after the positioning reference signal, or any combination thereof, and where determining the accuracy level further includes determining the accuracy level based on identifying the one or more measurement gaps, the one or more guard periods, or a combination thereof.

Some examples of the method, apparatuses, and non-transitory computer-readable medium described herein may further include operations, features, means, or instructions for bypassing at least one portion of a transmit chain associated with the scheduled transmission of the positioning reference signal or a receive chain associated with a scheduled reception of a second positioning reference signal, where bypassing the at least one portion of the transmit chain or the receive chain may be based on identifying the one or more measurement gaps and the one or more guard periods. In some examples, identifying one or more timings associated with the second positioning reference signal may include identifying one or more timing measurements associated with the second positioning reference signal.

In some examples of the method, apparatuses, and non-transitory computer-readable medium described herein, the at least one portion of the transmit chain or the receive chain includes a surface acoustic wave filter.

In some examples of the method, apparatuses, and non-transitory computer-readable medium described herein, the positioning reference signal includes an uplink positioning reference signal and the second positioning reference signal includes a downlink positioning reference signal.

Some examples of the method, apparatuses, and non-transitory computer-readable medium described herein may further include operations, features, means, or instructions for identifying, based on the configuration signal, whether the positioning reference signal may be intended for performing positioning measurements, performing communications, or any combination thereof, where the accuracy level associated with the one or more timing measurements may be based on the identifying.

Some examples of the method, apparatuses, and non-transitory computer-readable medium described herein may further include operations, features, means, or instructions for identifying that the positioning reference signal may be intended for performing the positioning measurements, and bypassing at least one portion of a transmit chain associated with a scheduled transmission of the positioning reference signal, where the accuracy level associated with the one or more timing measurements may be based on bypassing the at least one portion of the transmit chain.

Some examples of the method, apparatuses, and non-transitory computer-readable medium described herein may further include operations, features, means, or instructions for identifying that the positioning reference signal may be intended for performing the positioning measurements and the communications, and determining a second accuracy level associated with the one or more timing measurements based on the identifying, where the accuracy level associated with the one or more timing measurements may be greater than the second accuracy level associated with the one or more timing measurements.

In some examples of the method, apparatuses, and non-transitory computer-readable medium described herein, the positioning reference signal includes a sounding reference signal.

Some examples of the method, apparatuses, and non-transitory computer-readable medium described herein may further include operations, features, means, or instructions for identifying, based on the configuration signal, whether the positioning reference signal may be simultaneously transmitted with a channel, where the channel may be in a same component carrier as the positioning reference signal or a different component carrier as the positioning reference signal, where the accuracy level associated with the one or more timing measurements may be based on the identifying.

Some examples of the method, apparatuses, and non-transitory computer-readable medium described herein may further include operations, features, means, or instructions for identifying, based on the configuration signal, whether a transmission power associated with the positioning reference signal satisfies a threshold, where the accuracy level associated with the one or more timing measurements may be based on the identifying.

Some examples of the method, apparatuses, and non-transitory computer-readable medium described herein may further include operations, features, means, or instructions for identifying that the transmission power associated with the positioning reference signal satisfies the threshold, and bypassing at least one portion of a transmit chain associated with a scheduled transmission of the positioning reference signal, where the accuracy level associated with the one or more timing measurements may be based on bypassing the at least one portion of the transmit chain.

Some examples of the method, apparatuses, and non-transitory computer-readable medium described herein may further include operations, features, means, or instructions for identifying that the transmission power associated with the positioning reference signal does not satisfy the threshold, and determining a second accuracy level associated with the one or more timing measurements based on the identifying, where the accuracy level associated with the one or more timing measurements may be greater than the second accuracy level associated with the one or more timing measurements.

Some examples of the method, apparatuses, and non-transitory computer-readable medium described herein may further include operations, features, means, or instructions for reporting, to a base station, a UE capability associated with a frequency band, a combination of frequency bands, or both, where the threshold may be based on the UE capability.

Some examples of the method, apparatuses, and non-transitory computer-readable medium described herein may further include operations, features, means, or instructions for identifying, based on the configuration signal, a duration of the positioning reference signal during a period of time, determining whether the duration of the positioning reference signal satisfies a threshold, and bypassing, based on determining that the duration of the positioning reference signal satisfies the threshold, at least one portion of a transmit chain associated with a scheduled transmission of the positioning reference signal, where the accuracy level associated with the one or more timing measurements may be based on bypassing the at least one portion of the transmit chain.

In some examples of the method, apparatuses, and non-transitory computer-readable medium described herein, the duration of the positioning reference signal includes a number of symbols and the period of time includes one millisecond.

Some examples of the method, apparatuses, and non-transitory computer-readable medium described herein may further include operations, features, means, or instructions for identifying, based on the configuration signal, a bandwidth associated with the positioning reference signal, and determining that the bandwidth associated with the positioning reference signal satisfies a positioning reference signal bandwidth threshold, where the accuracy level associated with the one or more timing measurements may be non-proportional to the bandwidth associated with the positioning reference signal.

Some examples of the method, apparatuses, and non-transitory computer-readable medium described herein may further include operations, features, means, or instructions for reporting, to a base station, a UE capability associated with a frequency band, a combination of frequency bands, or both, where the positioning reference signal bandwidth threshold may be based on the UE capability.

Some examples of the method, apparatuses, and non-transitory computer-readable medium described herein may further include operations, features, means, or instructions for identifying, based on the configuration signal, a location of a sub-band associated with a scheduled transmission of the positioning reference signal, where the accuracy level associated with the one or more timing measurements may be based on the location of the sub-band.

In some examples of the method, apparatuses, and non-transitory computer-readable medium described herein, an accuracy associated with the sub-band located at a center of a frequency band may be greater than an accuracy associated with the sub-band located at an edge of the frequency band.

Some examples of the method, apparatuses, and non-transitory computer-readable medium described herein may further include operations, features, means, or instructions for reporting, to a base station, a UE capability associated with the positioning reference signal, where the location of the sub-band associated with the scheduled transmission of the positioning reference signal may be based on the UE capability.

Some examples of the method, apparatuses, and non-transitory computer-readable medium described herein may further include operations, features, means, or instructions for determining a second configuration for a second positioning reference signal, determining one or more properties associated with the second positioning reference signal based on the second configuration, and determining a second accuracy level associated with a timing difference between a reception of the positioning reference signal and a transmission of the second positioning reference signal, where a timing of reception of the positioning reference signal is based on identifying the one or more timing measurements associated with the positioning reference signal, and where the measurement report may be related to the second accuracy level.

In some examples of the method, apparatuses, and non-transitory computer-readable medium described herein, the one or more timing measurements include a group delay timing measurement, a transmission timing measurement, a reception timing measurement, or any combination thereof, the group delay timing measurement being associated with a reception of the positioning reference signal and a transmission of a second positioning reference signal.

In some examples of the method, apparatuses, and non-transitory computer-readable medium described herein, the accuracy level associated with the one or more timing measurements may be different for a first frequency range and a second frequency range.

A method of wireless communication is described. The method may include transmitting, to a UE, a configuration signal indicating a configuration for a positioning reference signal, indicating one or more properties associated with the positioning reference signal using the configuration signal, where an accuracy level associated with one or more timing measurements is determined based on the one or more properties associated with the positioning reference signal, and receiving a measurement report associated with the positioning reference signal, where the measurement report is related to the accuracy level associated with the one or more timing measurements.

An apparatus for wireless communication is described. The apparatus may include a processor, memory in electronic communication with the processor, and instructions stored in the memory. The instructions may be executable by the processor to cause the apparatus to transmit, to a UE, a configuration signal indicating a configuration for a positioning reference signal, indicate one or more properties associated with the positioning reference signal using the configuration signal, where an accuracy level associated with one or more timing measurements is determined based on the one or more properties associated with the positioning reference signal, and receive a measurement report associated with the positioning reference signal, where the measurement report is related to the accuracy level associated with the one or more timing measurements.

Another apparatus for wireless communication is described. The apparatus may include means for transmitting, to a UE, a configuration signal indicating a configuration for a positioning reference signal, indicating one or more properties associated with the positioning reference signal using the configuration signal, where an accuracy level associated with one or more timing measurements is determined based on the one or more properties associated with the positioning reference signal, and receiving a measurement report associated with the positioning reference signal, where the measurement report is related to the accuracy level associated with the one or more timing measurements.

A non-transitory computer-readable medium storing code for wireless communication is described. The code may include instructions executable by a processor to transmit, to a UE, a configuration signal indicating a configuration for a positioning reference signal, indicate one or more properties associated with the positioning reference signal using the configuration signal, where an accuracy level associated with one or more timing measurements is determined based on the one or more properties associated with the positioning reference signal, and receive a measurement report associated with the positioning reference signal, where the measurement report is related to the accuracy level associated with the one or more timing measurements.

Some examples of the method, apparatuses, and non-transitory computer-readable medium described herein may further include operations, features, means, or instructions for scheduling one or more measurement gaps, one or more guard periods associated with a scheduled transmission of the positioning reference signal, or a combination thereof, where the one or more measurement gaps and the one or more guard periods may be scheduled before the positioning reference signal, after the positioning reference signal, or any combination thereof, and where the accuracy level may be based on scheduling the one or more measurement gaps, the one or more guard periods, or a combination thereof.

Some examples of the method, apparatuses, and non-transitory computer-readable medium described herein may further include operations, features, means, or instructions for configuring the UE to bypass at least one portion of a transmit chain or a receive chain associated with a scheduled transmission of the positioning reference signal, where bypassing the at least one portion of the transmit chain or the receive chain may be based on scheduling the one or more measurement gaps and the one or more guard periods.

In some examples of the method, apparatuses, and non-transitory computer-readable medium described herein, the at least one portion of the transmit chain or the receive chain includes a surface acoustic wave filter.

In some examples of the method, apparatuses, and non-transitory computer-readable medium described herein, the positioning reference signal includes an uplink positioning reference signal and the second positioning reference signal includes a downlink positioning reference signal.

Some examples of the method, apparatuses, and non-transitory computer-readable medium described herein may further include operations, features, means, or instructions for indicating, using the configuration signal, whether the positioning reference signal may be intended for performing positioning measurements, performing communications, or any combination thereof.

Some examples of the method, apparatuses, and non-transitory computer-readable medium described herein may further include operations, features, means, or instructions for indicating that the positioning reference signal may be intended for performing the positioning measurements, and configuring the UE to bypass at least one portion of a transmit chain associated with a scheduled transmission of the positioning reference signal, where the accuracy level associated with the one or more timing measurements may be based on bypassing the at least one portion of the transmit chain.

In some examples of the method, apparatuses, and non-transitory computer-readable medium described herein, the positioning reference signal includes a sounding reference signal.

Some examples of the method, apparatuses, and non-transitory computer-readable medium described herein may further include operations, features, means, or instructions for indicating, using the configuration signal, whether the positioning reference signal may be simultaneously transmitted with a channel, where the channel may be in a same component carrier as the positioning reference signal or a different component carrier as the positioning reference signal.

Some examples of the method, apparatuses, and non-transitory computer-readable medium described herein may further include operations, features, means, or instructions for indicating, using the configuration signal, whether a transmission power associated with the positioning reference signal satisfies a threshold.

Some examples of the method, apparatuses, and non-transitory computer-readable medium described herein may further include operations, features, means, or instructions for receiving, from the UE, a UE capability associated with a frequency band, a combination of frequency bands, or both, where the threshold may be based on the UE capability.

Some examples of the method, apparatuses, and non-transitory computer-readable medium described herein may further include operations, features, means, or instructions for indicating, using the configuration signal, a duration of the positioning reference signal during a period of time, where the duration of the positioning reference signal includes a number of symbols and the period of time includes one millisecond.

Some examples of the method, apparatuses, and non-transitory computer-readable medium described herein may further include operations, features, means, or instructions for indicating, using the configuration signal, a bandwidth associated with the positioning reference signal.

Some examples of the method, apparatuses, and non-transitory computer-readable medium described herein may further include operations, features, means, or instructions for receiving, from the UE, a UE capability associated with a frequency band, a combination of frequency bands, or both, where a positioning reference signal bandwidth threshold may be based on the UE capability.

Some examples of the method, apparatuses, and non-transitory computer-readable medium described herein may further include operations, features, means, or instructions for indicating, using the configuration signal, a location of a sub-band associated with a scheduled transmission of the positioning reference signal, where an accuracy associated with the sub-band located at a center of a frequency band may be greater than an accuracy associated with the sub-band located at an edge of the frequency band.

Some examples of the method, apparatuses, and non-transitory computer-readable medium described herein may further include operations, features, means, or instructions for receiving, from the UE, a UE capability associated with the positioning reference signal, where the location of the sub-band associated with the scheduled transmission of the positioning reference signal may be based on the UE capability.

In some examples of the method, apparatuses, and non-transitory computer-readable medium described herein, the one or more timing measurements include a group delay timing measurement, a transmission timing measurement, a reception timing measurement, or any combination thereof, the group delay timing measurement being associated with a reception of the positioning reference signal and a transmission of a second positioning reference signal.

In some examples of the method, apparatuses, and non-transitory computer-readable medium described herein, the accuracy level associated with the one or more timing measurements may be different for a first frequency range and a second frequency range.

DETAILED DESCRIPTION

Figure 1:
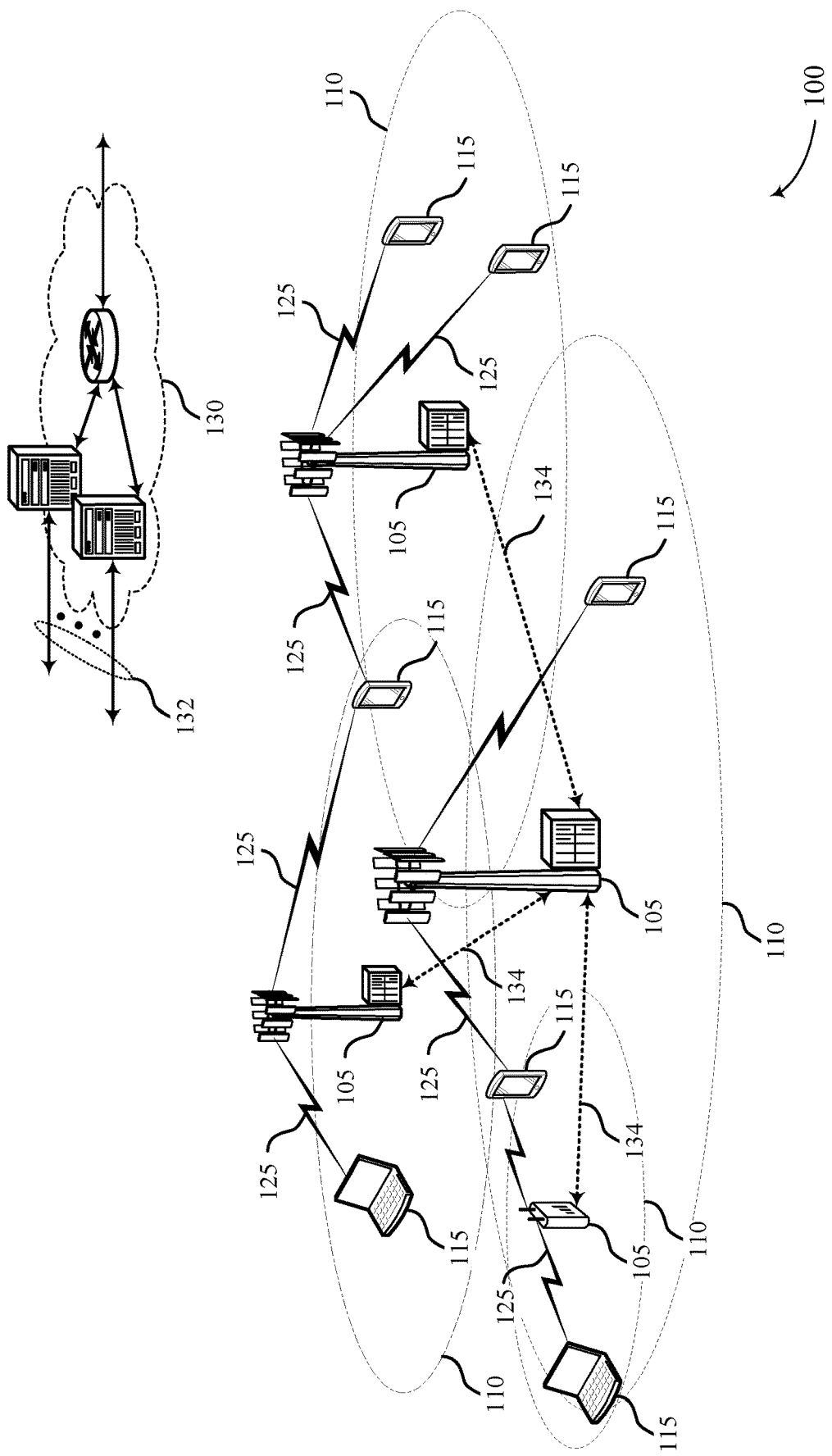
FIG. 1 illustrates an example of a system for wireless communications that supports group delay timing accuracy for positioning in New Radio (NR) in accordance with aspects of the present disclosure.

A user equipment (UE) in a wireless communications system may communicate with one or more base stations. A serving base station of a UE may keep track of the location or position of the UE. Various positioning techniques may be used to track the UE. In some cases, the UE may be configured to transmit to an uplink positioning reference signal to the serving base station and one or more neighboring base stations. Additionally or alternatively, the UE may be configured to receive a downlink positioning reference signal from the serving base station and one or more neighboring base stations. In some cases, the UE may estimate its positioning based on the measurements, for example based on reference signal time difference measurements. Additionally or alternatively, the UE may transmit measurement reports for the one or more positioning reference signals to a serving base station. Conventional systems may be deficient in estimating a position of the UE. For example, the UE may experience a variation in group delay which may include a part-specific delay, a frequency-specific delay, a path-specific delay, a temperature-specific delay, or any combination thereof.

According to one or more aspects of the present disclosure, a UE may receive a configuration signal. In some aspects, the UE may receive the configuration signal from a base station. In some cases, the configuration signal may indicate a configuration for a positioning reference signal. In some cases, the configuration signal may be associated with a downlink positioning reference signal transmitted by a serving or neighboring cell. The UE may determine one or more properties associated with the positioning reference signal based on the configuration signal. In one example, the one or more properties may include identifying one or more measurement gaps, one or more guard periods associated with a scheduled transmission of an uplink positioning reference signal, or a combination thereof. Additionally or alternatively, using the one or more properties, the UE may determine whether the positioning reference signal is intended for performing positioning measurements, performing communications, or any combination thereof.

In some cases, the UE may determine one or more timings associated with the positioning reference signal. Additionally, the UE may determine an accuracy level associated with one or more timing measurements based on the one or more properties associated with the positioning reference signal. For example, the UE may determine an accuracy expected on one or more timing measurements based on one or more transmission or measurement properties. In some examples, the UE may determine an accuracy level associated with a transmission timing for the positioning reference signal, an accuracy level associated with a reception timing for the positioning reference signal, an accuracy level associated with a time difference between a reception of the positioning reference signal and a transmission of a second positioning reference signal, or any combination thereof. The UE may then transmit a measurement report associated with the positioning reference signal to the base station. In some examples, the measurement report may be related to the accuracy level associated with the one or more timing measurements.

Aspects of the disclosure are initially described in the context of a wireless communications system. Aspects of the disclosure are further illustrated by and described with reference to apparatus diagrams, system diagrams, and flowcharts that relate to group delay timing accuracy for positioning in NR.

FIG. 1 illustrates an example of a wireless communications system 100 that supports group delay timing accuracy for positioning in NR in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles (e.g. automobile, bicycle, etc.), meters, wearables (e.g., watches, glasses, clothing, shoes, jewelry, head mounted displays, etc.), home devices (e.g., locks, lights, displays, etc.), video/audio devices (e.g. televisions, speakers, etc.), health diagnostic devices, therapeutic devices or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or any combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to any combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE in a wireless communications system may communicate with one or more base stations. Each base station may provide a cell which extends within a coverage area of the base station. The UE may move within the coverage area, and the cell may provide wireless communications (e.g., NR communications, or others) to the UE. A serving base station of a UE may keep track of the location or positioning of the UE. Various positioning techniques may be used to track the UE. In some cases, the UE may be configured to transmit an uplink positioning reference signal to the serving base station and one or more neighboring base stations. In some cases, the UE may be configured to receive a downlink positioning reference signal from the serving base station and one or more neighboring base stations. For an uplink positioning reference signal, the base station and the neighboring base stations may exchange information associated with the receipt of the uplink positioning reference signal, such as reference signal time difference measurements made by the UE. The network (e.g., including the one or more base stations) may then determine the location of the UE based on the one or more uplink positioning reference signal transmissions. For downlink positioning reference signal transmissions, the UE may receive a positioning reference signal from each of one or more base stations. In some cases, UE may estimate its positioning based on the measurements, for example, based on reference signal time difference measurements. Additionally or alternatively, the UE may transmit measurement reports for the one or more positioning reference signals to a serving base station.

In some conventional systems, a UE may experience delay in processing the positioning reference signal. For example, the delay may be based on radio frequency front-end processing (such as processing at one or more antennas) at the UE. In some cases, the UE may calibrate the radio frequency front-end group delays such that a measurement report reflects the radio frequency front-end group delay. Thus, in conventional systems, the UE may not be able to accurately perform timing measurements due to a variation in group delay. As one example, the UE may detect a part-specific delay while performing measurements associated with the positioning reference signal. Additionally or alternatively, the UE may be pre-configured (such as via a manufacturer) to experience a part-specific delay while performing measurements associated with the positioning reference signal. Other sources of variation in group delay may be frequency-specific, path-specific, temperature-specific, or any combination thereof. Thus, improved accuracy in performing one or more timing measurements may be desired.

Figure 5:
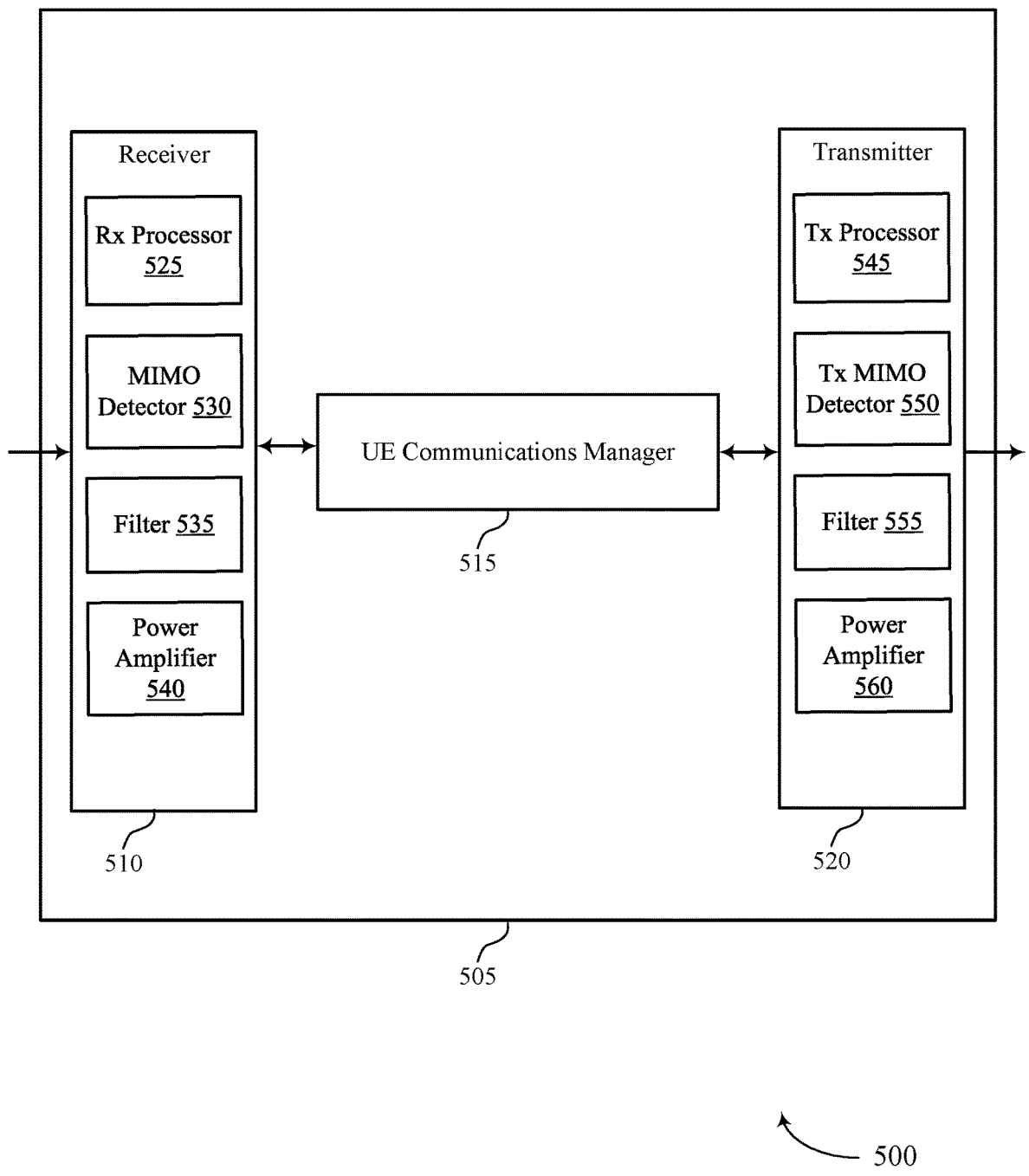
FIGS. 5 and 6 show block diagrams of devices that support group delay timing accuracy for positioning in NR in accordance with aspects of the present disclosure.
Figure 6:
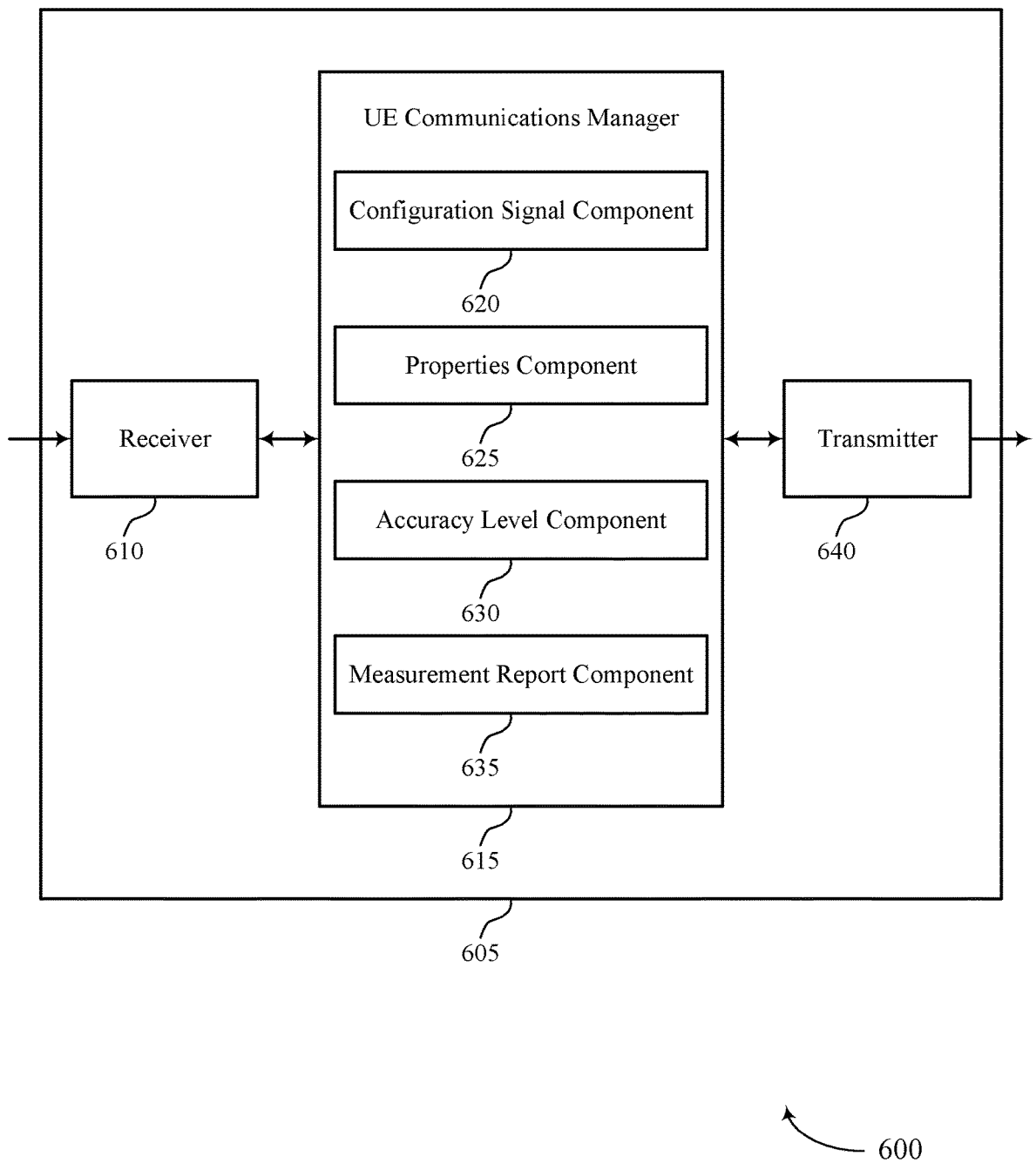
Figure 7:
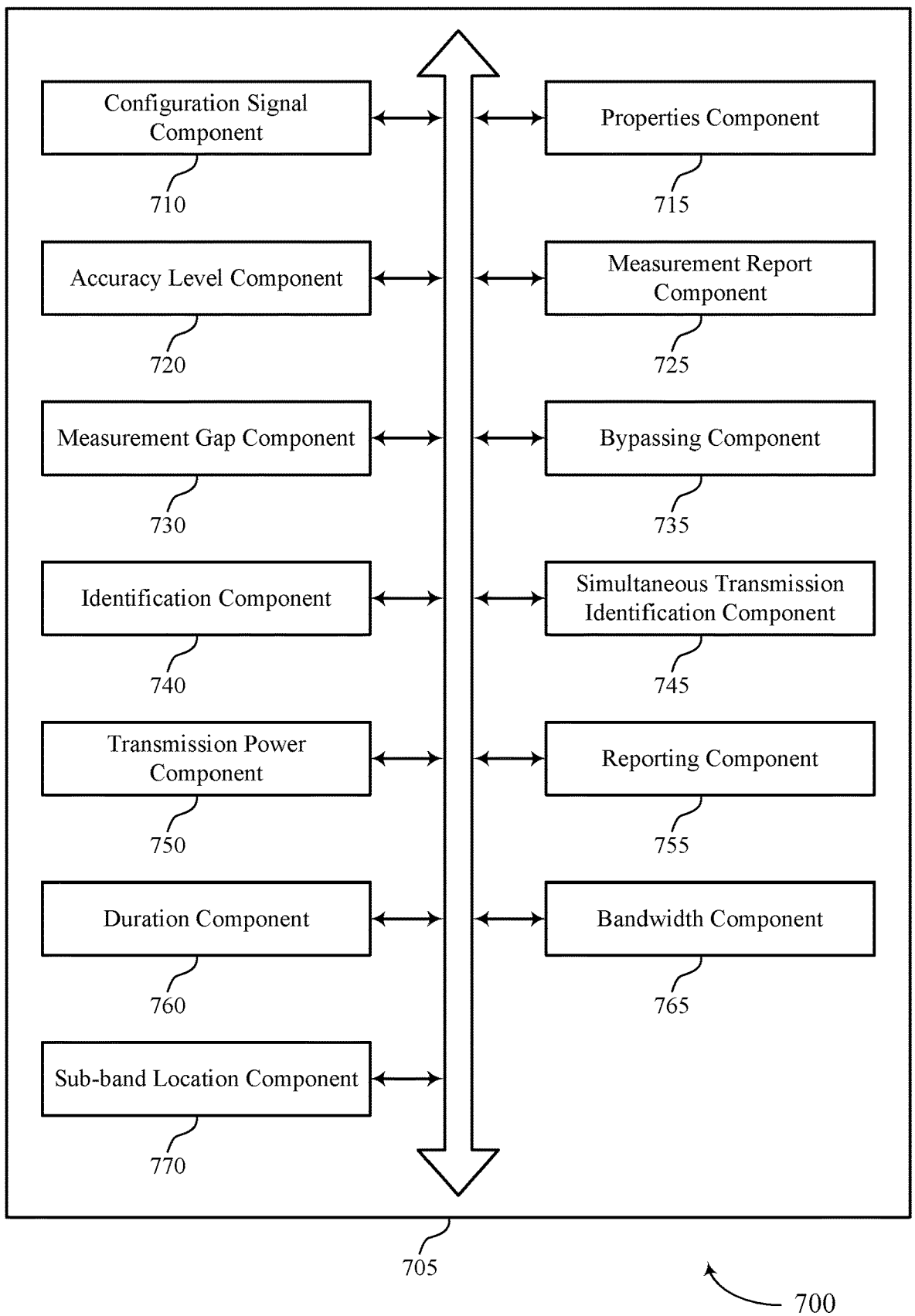
FIG. 7 shows a block diagram of a UE communications manager that supports group delay timing accuracy for positioning in NR in accordance with aspects of the present disclosure.
Figure 9:
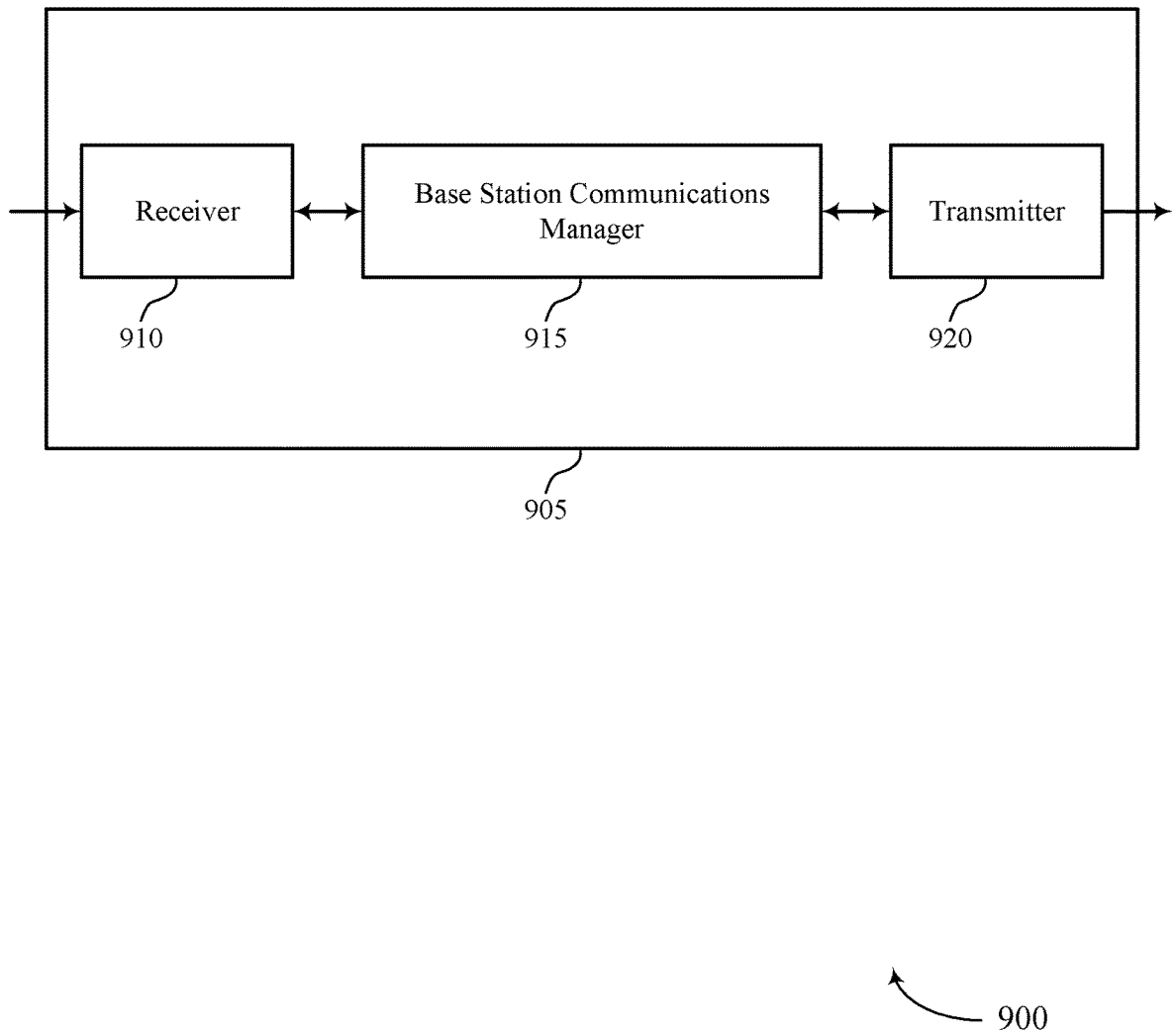
FIGS. 9 and 10 show block diagrams of devices that support group delay timing accuracy for positioning in NR in accordance with aspects of the present disclosure.
Figure 10:
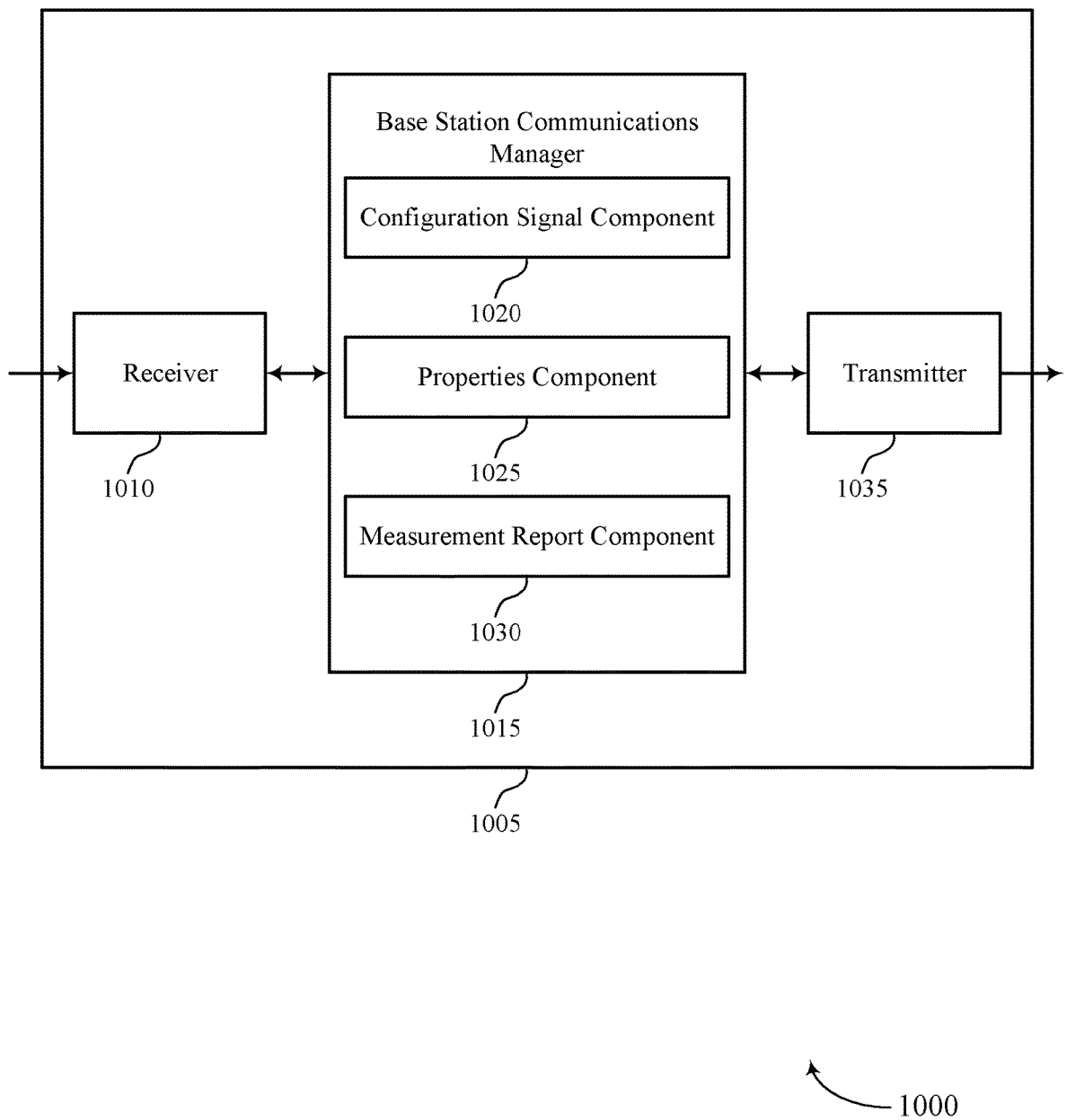
Figure 11:
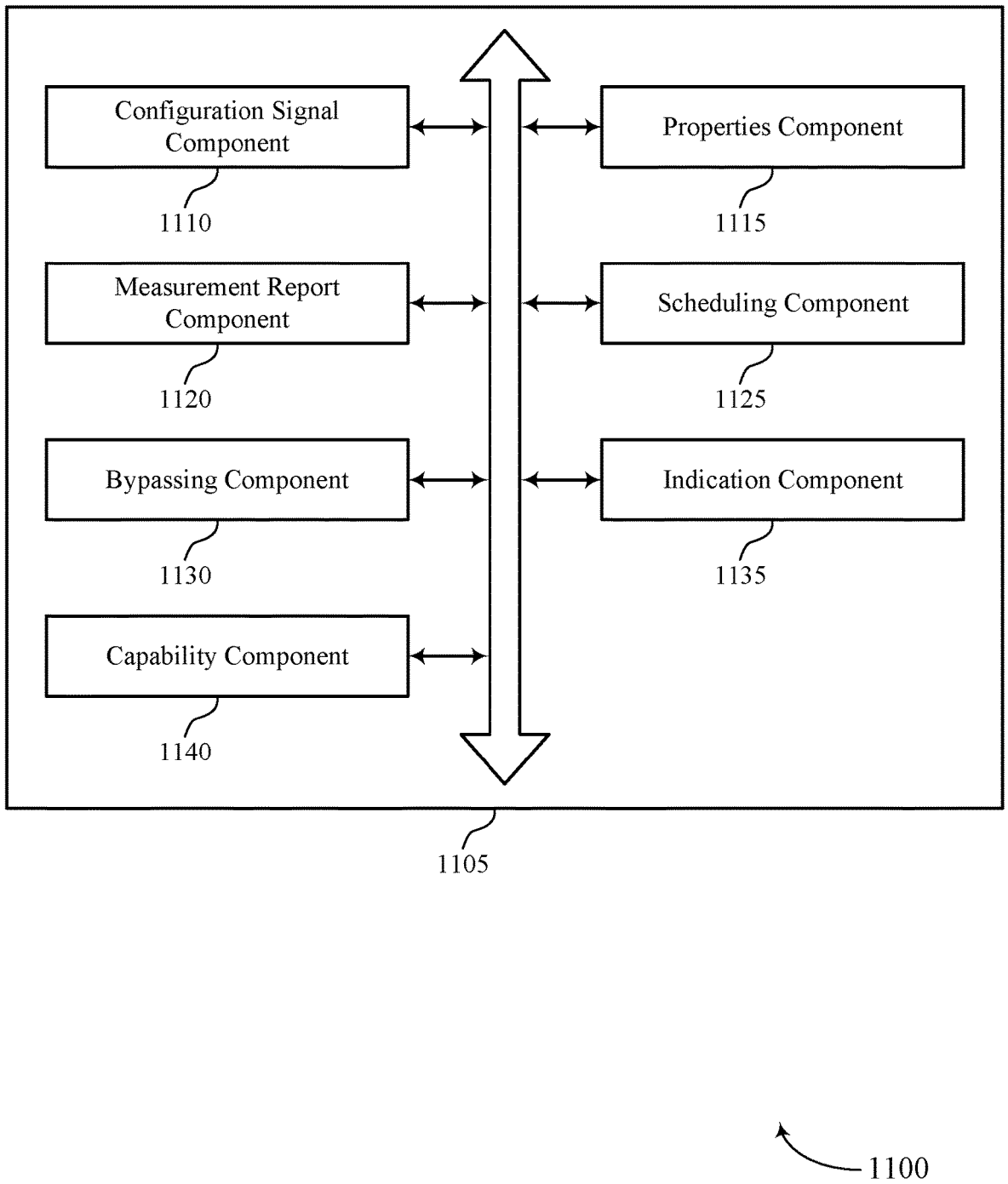
FIG. 11 shows a block diagram of a base station communications manager that supports group delay timing accuracy for positioning in NR in accordance with aspects of the present disclosure.

According to one or more aspects of the present disclosure, a UE 115 may include a UE communications manager (not shown) as depicted in the examples of FIGS. 5, 6, and 7 and a base station 105 may include a base station communications manager (not shown) as depicted in the examples of FIGS. 9, 10, and 11. The UE 115 may receive a configuration signal. In some cases, the configuration signal may indicate a configuration for a positioning reference signal. That is, the UE 115 may receive a configuration related to a downlink positioning reference signal transmitted by a serving or neighboring cell. The UE 115 may determine one or more properties associated with the positioning reference signal based on the configuration signal. Additionally, the UE 115 may determine one or more properties associated with an uplink positioning reference signal based on the configuration signal. In one example, the one or more properties may include identifying one or more measurement gaps and one or more guard periods associated with a scheduled transmission of the uplink positioning reference signal. In some cases, the UE 115 may identify one or more timings and may determine an accuracy level associated with one or more timing measurements based on identifying the one or more properties associated with the uplink positioning reference signal. For example, the UE 115 may determine an accuracy expected on one or more timing measurements based on one or more transmission or measurement properties. In some examples, the one or more timing measurements may include a group delay calibration, a transmission timing measurement, a reception timing measurement, or any combination thereof. The UE 115 may then transmit a measurement report associated with the positioning reference signal to the base station 105. In some examples, the measurement report may be related to the accuracy level associated with the one or more timing measurements. In some cases, the UE 115 may determine the accuracy level associated with the one or more timing measurements based on receiving an indication from the base station 105 (such as in the configuration signal or the configuration message). In some examples, the accuracy level may be a positioning accuracy associated with the position measurement uncertainty at the UE 115.

Figure 2:
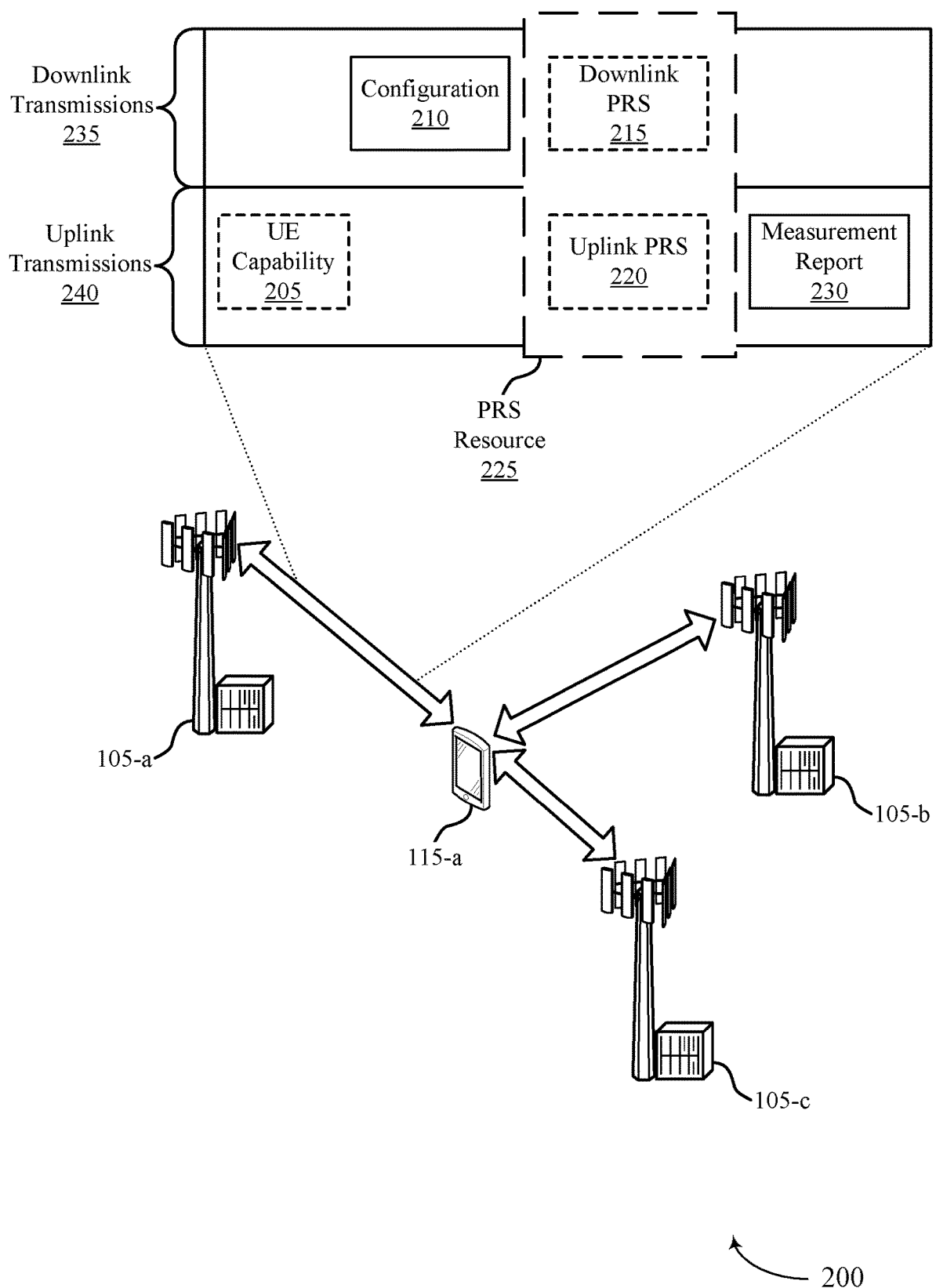
FIG. 2 illustrates an example of a wireless communications system that supports group delay timing accuracy for positioning in NR in accordance with aspects of the present disclosure.

FIG. 2 illustrates an example of a wireless communications system 200 that supports group delay timing accuracy for positioning in NR in accordance with aspects of the present disclosure. In some examples, the wireless communications system 200 may implement aspects of wireless communications system 100. The wireless communications system 200 may include one or more base stations 105 and one or more UEs 115, for example including base station 105-a, base station 105-b, base station 105-c, and UE 115-a. The base stations 105 described in FIG. 2 may be examples of the base stations 105 described with reference to FIG. 1. In some examples, base station 105-a, base station 105-b, and base station 105-c may be referred to as a network device and/or a next generation NodeB (gNB). UE 115-a may be an example of a UE 115 described with reference to FIG. 1. Base station 105-a may be an example of a serving base station 105 for UE 115-a, while base station 105-b and base station 105-c may be examples of neighboring base stations 105.

The wireless communications system 200 may illustrate operations of and communications between the base stations 105 and the UEs 115 that support determining accuracy for timing measurements for positioning in NR. Each base station 105 may provide a cell, where a base station 105 can provide service for a UE 115 within the coverage area of the cell. UE 115-a may move within the coverage area, and the cell may provide wireless communications to UE 115-a. In some cases, UE 115-a may be allocated a bandwidth part to communicate with a serving base station. Some examples of the wireless communications system 200 may support an improved timing accuracy determination procedures for positioning in NR. In some cases, the UE 115 may support identifying properties of a positioning reference signal, and utilizing the properties in order to reduce delay in timing measurements.

In some instances, the wireless communications system 200 may support beamformed communications, where a base station 105 and the UE 115-a may communicate using directional, beamformed transmissions. For this and other reasons (e.g., mobility management, etc.), the base station 105 (such as serving base station 105-a) may keep track of the location of UE 115-a and other UEs 115. Base stations 105 (such as one or more of base station 105-a, base station 105-b, and base station 105-c) and UE 115-a may implement a variety of techniques to support location management of wireless devices within the wireless communications system.

In some examples, the wireless network, including base station 105-a, may keep track of the geographic location or positioning of UE 115-a. Various positioning techniques may be used to track UE 115-a. Some techniques for determining the positioning of UE 115-a may include network-assisted Global Navigation Satellite System (GNSS) techniques (e.g., Global Positioning System (GPS)), barometric pressure sensing, wireless local area network (WLAN) signaling, Bluetooth signaling, and Terrestrial Beacon System techniques, among others. The implementation of some techniques may be based on the radio access technology (RAT) used for wireless communications between UE 115-a and the base stations 105. For example, techniques which use downlink positioning, tracking via an enhanced cell ID, and uplink positioning may be based on the RAT. Additionally or alternatively, base station 105-a and other, neighboring base station 105-b and base station 105-c may transmit a signal of interest, such as a positioning reference signal. The UE 115-a may receive and perform measurements on the signal of interest from the base stations 105 (e.g., base station 105-a, base station 105-b, and base station 105-c). These measurements may include observed time difference of arrival measurements, such as a reference signal time difference estimate.

In some cases, the UE 115-a may report the measurements or estimates made from the positioning reference signals (such as uplink positioning reference signal 220 and downlink positioning reference signal 215) to a base station (such as base station 105-a). In some cases, the base station 105-a may use the measurements to detect, or estimate, the positioning of the UE 115-a. Additionally or alternatively, the UE 115-a may estimate its positioning based on the measurements and transmit an estimation of positioning to base station 105-a. In some examples, the estimates or measurements may be sent to a location management function (LMF), and the LMF may estimate the location or positioning of UE 115-a.

In conventional wireless communications systems, the UE 115-a may experience delay in processing the positioning reference signal. For example, the delay may be based on radio frequency front-end processing (such as processing at one or more antennas) at the UE 115-a. In such cases, the UE 115-a is configured to calibrate the radio frequency front-end group delays such that a measurement report (such as a report indicating the measurements or estimates made from the positioning reference signals) reflects the radio frequency front-end group delay experienced at the UE 115-a. In such cases, upon receiving the measurement report, the base station 105-a may be configured to subtract the indicated radio frequency front-end group delay in order to calculate a distance from the UE 115-a. However, conventional wireless communications systems do not account for other sources of variation in group delay. As one example, the UE 115-a may detect a part-specific (such as hardware present in analog and digital paths) delay while performing measurements associated with the positioning reference signal. In some examples, multiple instances of reference designs of hardware may be tested to measure part-by-part variation. Additionally or alternatively, the UE 115-a may experience a frequency-specific delay in measurements associated with the positioning reference signal. In some cases, the accuracy of measurements associated with the positioning reference signal may be based on a portion of the frequency band where the positioning reference signal was received. In one example, a difference is measurement between a positioning reference signal transmitted at a lower band edge and a positioning reference signal transmitted at an upper band edge of a 5 GHz frequency band may be 500 ps. In such cases, the UE 115-a may be configured to calibrate per channel in order to avoid the discrepancies in timing measurements.

In some instances, the UE 115-a may experience a path-specific delay while performing measurements associated with the positioning reference signal. For example, the delay may be based on a selected antenna or panel, a transmission power, a transmission processing operation, a receive power, a receive processing operation, or any combination thereof. In some cases, the UE 115-a may experience a temperature-specific delay while performing measurements associated with the positioning reference signal. In such examples, the UE 115-a may maintain a calibration table for temperature.

Additionally or alternatively, the UE 115-a may experience other sources of error (such as calibration errors, measurement precision, etc.) while performing measurements associated with the positioning reference signal.

In conventional wireless communications systems, some parts or blocks in the transmitter or receiver of the UE 115-a may have relatively large group delay variations. As one example, a surface acoustic wave filter for sub-6 frequency range may have a large group delay variations. Table 1 demonstrates an example group delay variation of a surface acoustic wave filter. Table 2 demonstrates an example group delay variation of a transmit antenna. Table 3 demonstrates an example group delay variation of a receive antenna.

TABLE 1

| Parameter | Conditions | Minimum | Typical | Maximum | Units |
|---|---|---|---|---|---|
| Center Frequency | 1850-1910 MHz | — | 1880 | — | MHz |
| Maximum Insertion Loss | 1850-1910 MHz | — | 2.3 | 3.0 | dB |
| Amplitude Variation | 1850-1910 MHz | — | 0.5 | 1.0 | dB p-p |
| Amplitude Variation over any 5 MHz window | 1850-1910 MHz | — | 0.2 | 0.8 | dB p-p |
| Phase Ripple | 1850-1910 MHz | — | 12 | 30 | deg p-p |
| Group Delay Variation | 1850-1910 MHz | — | 7.7 | 25 | ns p-p |
| Absolute Group Delay | 1850-1910 MHz | — | 10 | 30 | ns |

TABLE 2

| Parameter | Condition | Minimum | Typical | Maximum | Units |
|---|---|---|---|---|---|
| Insertion Loss | 2305-2315 MHz | — | 1.7 | 2.3 | dB |
| Amplitude Ripple | 2305-2315 MHz | — | 0.3 | 0.9 | dB |
| Group Delay | 2305-2315 MHz | — | 31 | 40 | Ns |
| VSWR (in/out) | 2305-2315 MHz | — | 1:3:1 | 2:1 | — |
| Antenna Impedance | — | — | 50//5.1 nH^2 | — | Ohms |
| Transmission Impedance | — | — | 50 | — | Ohms |

TABLE 3

| Parameter | Condition | Minimum | Typical | Maximum | Units |
|---|---|---|---|---|---|
| Insertion Loss | 2350-2360 MHz | — | 1.9 | 2.8 | dB |
| Amplitude Ripple | 2350-2360 MHz | — | 0.2 | 0.9 | dB |
| Group Delay | 2350-2360 MHz | — | 34 | 40 | Ns |
| VSWR (in/out) | 2350-2360 MHz | — | 1:3:1 | 2:1 | — |
| Antenna Impedance | — | — | 50//5.1 nH^2 | — | Ohms |
| Reception Impedance | — | — | 50 | — | Ohms |

According to one or more aspects of the present disclosure, the UE 115-a and the base station 105-a may implement techniques to support enhanced positioning schemes and techniques. Specifically, one or more aspects of the present disclosure provide for the UE 115-*a* and the base station 105-*b* to determine an accuracy associated with at least one of a group delay calibration, transmission timing, reception timing, or any combination thereof. For example, the base station 105-*a* may transmit a configuration signal 210 indicating a configuration for a signal of interest (e.g., the positioning reference signal) to the UE 115-*a*, and the UE 115-*a* may determine an accuracy level associated with one or more timing measurements based on the one or more properties associated with the positioning reference signal as indicated in the configuration. In some cases, the UE 115-*a* may receive the configuration signal 210 in a higher layer signaling (such as an RRC signaling).

In some cases, UE 115-*a* may be configured to transmit to an uplink positioning reference signal 220 to the serving base station 105 and one or more neighboring base stations 105. In some cases, the UE 115-*a* may be configured to receive a downlink positioning reference signal 215 from the serving base station 105 and one or more neighboring base stations 105. Upon receipt of an uplink PRS positioning reference signal, base station 105-*a*, base station 105-*b*, and base station 105-*c* may exchange, for example via backhaul links, and information associated with the receipt of the uplink positioning reference signal 220, such as reference signal time difference measurements made by UE 115-*a*. The network (e.g., including the base stations) may then determine the location of UE 115-*a* based on the one or more uplink positioning reference signal 220. For downlink positioning reference signal techniques, the UE 115-*a* may receive a downlink positioning reference signal 215 from each of one or more base stations 105 (e.g., base station 105-*a*, base station 105-*b*, base station 105-*c*, or any combination thereof). In some cases, UE may estimate its positioning based on the measurements, for example based on reference signal time difference measurements. Additionally or alternatively, the UE 115-*a* may transmit measurement reports for the one or more positioning reference signals (such as uplink positioning reference signal 220 and/or downlink positioning reference signal 215) to a serving base station 105-*a*.

As previously discussed, a positioning technique may be UE-based or UE-assisted. In UE-based positioning, the UE 115-*a* may perform the positioning estimation without feeding back reference signal time difference measurements to the network (e.g., via a base station 105). In some cases, the UE 115-*a* may perform a UE-based positioning estimate based on received downlink positioning reference signal 215. In another example, the UE 115-*a* may receive positioning reference signal measurement reports from multiple base stations 105 in the network corresponding to one or more transmitted uplink positioning reference signal 220. The UE 115 may determine a position estimate from the received positioning reference signal measurement reports. In UE-assisted positioning, the UE 115-*a* may provide the reference signal time difference measurements, and the network may perform the positioning estimation using the reference signal time difference measurements. the UE 115-*a* may be configured for a UE-based mode, a UE-assisted mode, or a mode which incorporates aspects of both. The used positioning mode may be based on a connection initialization configuration, downlink control information, a media access control (MAC) control element (CE), etc.

The wireless communications system 200 may support a positioning reference signal resource 225. For example, base station 105-*a* may configure the positioning reference signal resource 225 for UE 115-*a*. The positioning reference signal resource 225 may span a bandwidth or frequency domain allocation. The base station 105-*a* may configure the positioning reference signal resource 225 using the configuration signal 210. In some cases, the configuration may include one or more configurations for the positioning reference signal resource 225. For example, the base station 105-*a* may indicate to the UE 115-*a*, a frequency domain allocation for the positioning reference signal resource 225 and use the positioning reference signal resource 225 to receive a downlink positioning reference signal 215 or transmit an uplink positioning reference signal 220.

As discussed herein, a downlink positioning reference signal 215 may be transmitted by a serving or neighboring cell can be configured to be transmitted in the bandwidth of the positioning reference signal resource 225. Additionally or alternatively, an uplink positioning reference signal may be transmitted by UE 115-*a* toward a serving or neighboring cell. The UE 115-*a* may similarly transmit the positioning reference signal in a positioning reference signal bandwidth for the uplink positioning reference signal 220. The UE 115-*a* may determine an accuracy expected on one or more timing measurements based on one or more transmission or measurement properties. In some examples, the one or more timing measurements may include a group delay calibration, a transmission timing measurement, a reception timing measurement, or any combination thereof.

According to one or more aspects of the present disclosure, the UE 115-*a* may identify one or more measurement gaps associated with a scheduled transmission of the positioning reference signal (such as uplink positioning reference signal 220 and/or downlink positioning reference signal 215). Additionally or alternatively, the UE 115-*a* may identify and one or more guard periods associated with a scheduled transmission of the positioning reference signal. In some cases, the one or more measurement gaps and/or the one or more guard periods may be scheduled before the positioning reference signal, after the positioning reference signal, or any combination thereof. That is, the UE 115-*a* may identify a measurement gap before or after the downlink positioning reference signal 215 or the uplink positioning reference signal 220. The measurement gap may span a number of symbols (e.g., OFDM symbols) during which the UE 115-*a* is not expected to transmit or receive any other signal (e.g., in up to all carriers). In some cases, a base station (such as base station 105-*a*) may signal the measurement gap to the UE 115-*a*. In some cases, the measurement gap may be indicated to be 0 symbols long, or the measurement gap may not be indicated at all.

Upon identifying the one or more measurement gaps and/or one or more guard periods, the UE 115-*a* may determine an accuracy for timing measurements associated with a transmission of a positioning reference signal. In some cases, the positioning reference signal may include a sounding reference signal. Specifically, the UE 115-*a* may bypass at least one portion of a transmit chain associated with the scheduled transmission of an uplink positioning reference signal or a receive chain associated with a scheduled reception of a downlink positioning reference signal (such as uplink positioning reference signal 220 and/or downlink positioning reference signal 215). For example, in order to improve the accuracy for timing measurements, the UE 115-*a* may bypass one or more blocks or parts of the transmit chain during transmission of a positioning reference signal. The one or more blocks or parts of the transmit chain may include a surface acoustic wave filter. In such a case, the UE 115-*a* may be configured to switch off the surface acoustic wave filter during the measurement gap and/or guard period and perform the timing measurements. After completion of the timing measurements, the UE 115-*a* may switch on the surface acoustic wave filter. That is, the UE 115-*a* may stop its regular transmissions while performing a measurement associated with the positioning reference signal, and may then switch on the surface acoustic wave filter to continue with its regular transmissions. As described herein with reference to Table 1, a group delay variation for a surface acoustic wave filter is high. Thus, by bypassing the use of the surface acoustic wave filter, the UE 115-*a* may increase the accuracy associated with one or more timing measurements for the positioning reference signal (such as uplink positioning reference signal 220 and/or downlink positioning reference signal 215).

In some cases, the UE 115-*a* may receive the configuration signal 210 and may identify whether a positioning reference signal (such as uplink positioning reference signal 220 and/or downlink positioning reference signal 215) is intended for performing positioning measurements, performing communications, or any combination thereof. In some cases, the UE 115-*a* may perform this identification based on the received configuration signal 210. If the UE 115-*a* determines that the positioning reference signal (such as a sounding reference signal) is intended for positioning purposes, then the UE 115-*a* may bypass at least one portion of a transmit chain associated with a scheduled transmission of the positioning reference signal. For example, the UE 115-*a* may bypass one or more blocks of the transmit chain associated with a positioning reference signal. Additionally or alternatively, the UE 115-*a* may transmit the positioning reference signal in a manner which increases the group delay or timing accuracy. In some cases, bypassing one or more blocks of the transmit chain associated with a positioning reference signal may not be favorable for communication purposes. In such cases, the UE 115-*a* may identify that the positioning reference signal (such as uplink positioning reference signal 220) is intended for performing both positioning measurements and communications. The UE 115-*a* may then determine a second accuracy level associated with the one or more timing measurements based on the identifying. The accuracy level associated with positioning reference signal intended for performing positioning measurements may be greater than the second accuracy level associated with positioning reference signal intended for performing both positioning measurements and communications. That is, if the UE 115-*a* determines that a positioning reference signal (such as a sounding reference signal) is intended to be used for both positioning and communication, then the UE 115-*a* may not be able to perform changes in the transmit chain structure, and the group delay/timing accuracy may be lower.

According to one or more aspects of the present disclosure, the UE 115-*a* may receive the configuration signal 210 and may determine whether a positioning reference signal is simultaneously transmitted with a channel. In some cases, the UE 115-*a* may perform the determination based on receiving the configuration signal 210. In some instances, the channel may be in the same component carrier as the positioning reference signal or a different component carrier as the positioning reference signal. In some examples, the UE 115-*a* may determine the accuracy level associated with the one or more timing measurements are based on the determination. The UE 115-*a* may determine that a change in the transmission of the positioning reference signal may affect other physical channel transmission on the same component carrier or different component carrier.

According to some implementations, the UE 115-*a* may determine whether a transmission power associated with a positioning reference signal satisfies a threshold. In some cases, the UE 115-*a* may receive the configuration signal 210. For example, the UE 115-*a* may receive the configuration signal 210 from the base station 105-*a*, and may perform the determination based on the configuration signal 210. In some cases, the accuracy level associated with one or more timing measurements may be based on the identifying. If the UE 115-*a* determines that the transmission power associated with the positioning reference signal satisfies the threshold, then the UE 115-*a* may bypass at least one portion of a transmit chain associated with a scheduled transmission of the positioning reference signal (such as uplink positioning reference signal 220). In one example, if the transmission power associated with a positioning reference signal (such as a sounding reference signal) is greater than a threshold, the UE 115-*a* may determine that bypassing a portion of the transmit chain may hamper the emissions requirement. In such cases, the UE 115-*a* may determine a second accuracy level associated with the timing measurement for the positioning reference signal. Alternatively, if the UE 115-*a* determines that the transmission power associated with a positioning reference signal is less than the threshold, then the UE 115-*a* may choose to bypass a portion (such as a surface acoustic wave filter) of the transmit chain in order to achieve higher accuracy for timing measurements. In some cases, the threshold may be or may be based on a UE capability 205. In some cases, the UE 115-*a* may report the UE capability 205 to a base station (such as base station 105-*a*). The UE capability 205 may be associated with a frequency band, a combination of frequency bands, or both.

According to one or more aspects of the present disclosure, the UE 115-*a* may identify a duration of the positioning reference signal during a period of time. In some cases, the UE 115-*a* may identify the duration based on the configuration signal 210. The UE 115-*a* may then determine whether the duration of the positioning reference signal satisfies a threshold. For example, the UE 115-*a* may determine whether the duration of a positioning reference signal burst during a specific period of time is configured as short bursts. Upon determining that the duration of the positioning reference signal satisfies the threshold, the UE 115-*a* may bypass least one portion of a transmit chain associated with a scheduled transmission of the positioning reference signal. That is, if the UE 115-*a* determines that a positioning reference signal (such as a sounding reference signal) is configured as short bursts of resources over a specific period of time (e.g., 1 ms), then the UE 115-*a* may bypass the surface acoustic wave filter and achieve higher accuracy. In some cases, the duration of the positioning reference signal may include a number of symbols.

In some instances, the UE 115-*a* may identify a bandwidth associated with the positioning reference signal. For example, the UE 115-*a* may identify the bandwidth based on a configuration signal 210. Although it is discussed that the UE 115-*a* receives the configuration signal from a base station, it may be understood that the UE 115-*a* may receive the configuration signal from a different device. In some cases, the UE 115-*a* may receive the configuration signal from a device using a different communication technology than the UE 115-*a*. For example, the UE 115-*a* may be operating using NR technology, and may receive the configuration signal from a device operating using a Wi-Fi technology or a Bluetooth technology. In some cases, the UE 115-*a* may receive the configuration signal using peer-to-peer connection. For example, the UE 115-*a* may receive the configuration signal from a nearby device (such as a second UE 115 or an IoT device) using peer-to-peer connection. In some examples, the UE 115-*a* may determine that the bandwidth associated with the positioning reference signal satisfies a positioning reference signal bandwidth threshold. In some cases, an accuracy level associated with one or more timing measurements may be non-proportional to the bandwidth associated with the positioning reference signal. For example, the accuracy level may not be proportionally inverse to a bandwidth for a sounding reference signal, as a high bandwidth may be associated with different transmission-reception calibration. As a result, different positioning reference signal bandwidth thresholds may be associated with different accuracies.

According to one or more aspects of the present disclosure, the UE 115-*a* may identify a location of a sub-band associated with a scheduled transmission of the positioning reference signal. For instance, the UE 115-*a* may identify whether the positioning reference signal is transmitted in an edge of a sub-band, or in a center of a sub-band. In some cases, an accuracy associated with the sub-band located at a center of a frequency band may be greater than an accuracy associated with the sub-band located at an edge of the frequency. In some examples, the location of the sub-band may be based on a UE capability reported to the base station 105-*a*. Additionally or alternatively, the UE 115-*a* may determine that the accuracy level associated with the one or more timing measurements is different for a first frequency range and a second frequency range.

In some cases, the UE 115-*a* may transmit a measurement report 230 associated with the positioning reference signal. The measurement report 230 may be related to the accuracy level associated with the one or more timing measurements. The base station may receive the measurement report 230, and may determine the position of the UE 115-*a* based on the measurement report 230.

Figure 3A:
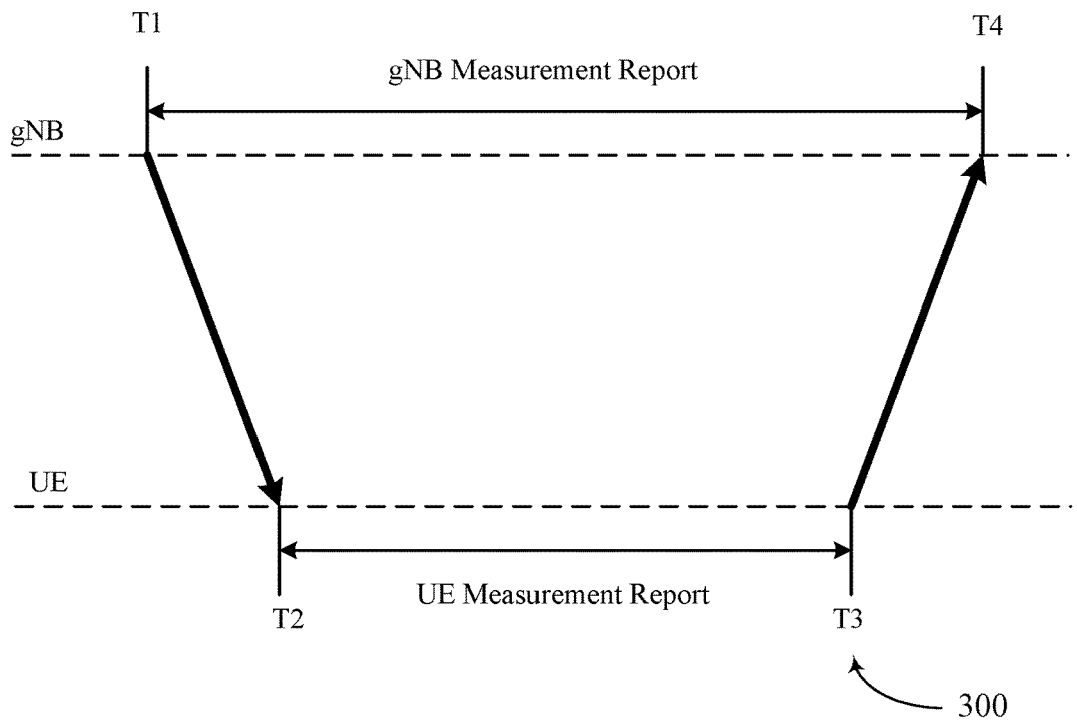
FIGS. 3A and 3B illustrate an example of timing estimations that support group delay timing accuracy for positioning in NR in accordance with aspects of the present disclosure.
Figure 3B:
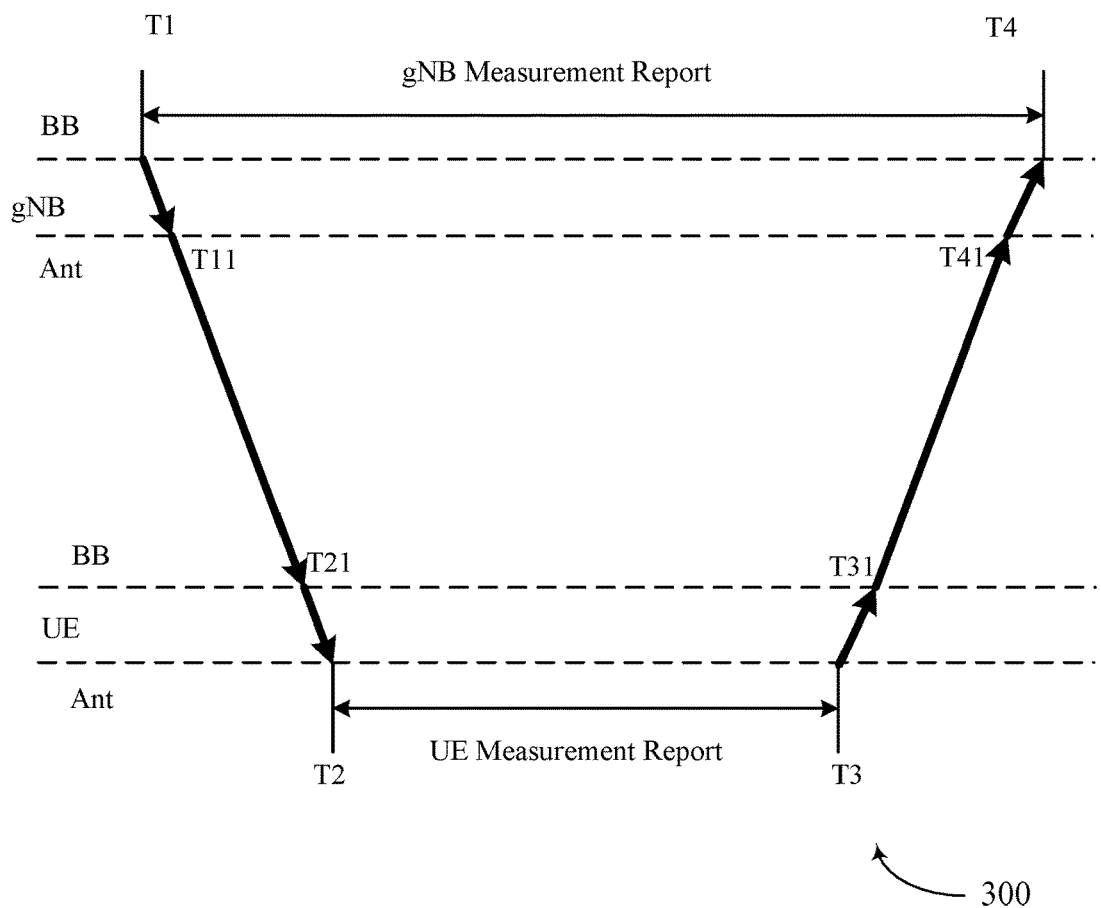

FIG. 3A illustrates an example of timing estimation 300 that supports group delay timing accuracy for positioning in NR in accordance with aspects of the present disclosure. FIG. 3B illustrates an example of timing estimation 350 that supports group delay timing accuracy for positioning in NR in accordance with aspects of the present disclosure. In some examples, timing estimation 300 and timing estimation 350 may implement aspects of wireless communications system 100.

As depicted in the example of FIGS. 3A and 3B, a base station may determine a position of a UE position based on a time of arrival estimation. As described in FIG. 3A, a base station (such as base station 105) may transmit a downlink reference signal at time $T_1$. The UE may receive the downlink reference signal at time $T_2$. In some cases, the UE may measure a time of arrival for the downlink reference signal at time $T_2$. In some cases, the UE may transmit an uplink reference signal at $T_3$. Additionally, the UE may transmit a UE measurement report $T_{Rx \to Tx}$. For example, the UE measurement report $T_{Rx \to Tx}$ may indicate a time difference between receiving a downlink reference signal and transmitting an uplink reference signal (i.e., $T_3-T_2$). The base station may receive the uplink reference signal at time $T_4$. The base station may then measure the time of arrival for the uplink reference signal at time $T_4$ and determine a gNB measurement report $T_{Tx \to Rx}$. Specifically, the base station may determine a gNB measurement report $T_{Tx \to Rx} = T_4 - T_1$ (or a time difference between transmitting a downlink reference signal and receiving an uplink reference signal). The base station may then calculate a distance from the UE based on the gNB measurement report and the UE measurement report. In one example, the base station may calculate the distance d as:

$$d = \frac{1}{2c}(T_{Tx \to Rx} - T_{Rx-Tx}) = \frac{1}{2c}(T_2 - T_1) - \frac{1}{2c}(T_4 - T_3)$$

With respect to FIG. 3B, a base station (such as base station 105) may transmit a downlink reference signal at time $T_1$. The downlink reference signal may be transmitted from the radio frequency front end of the base station at time $T_{11}$. The UE may receive the downlink reference signal at time $T_{21}$. That is, an antenna at the UE downlink reference signal at time $T_{21}$, and the radio frequency front end of the UE may complete reception of the downlink reference signal at time $T_2$. In some cases, the UE may measure a time of arrival for the downlink reference signal at time $T_2$. In some cases, the UE may transmit an uplink reference signal at $T_3$, and the uplink reference signal may be transmitted through the radio frequency front end of the UE at time $T_{31}$. In some cases, the UE may transmit a UE measurement report $T_{Rx \to Tx}$ indicating a time difference between receiving a downlink reference signal and transmitting an uplink reference signal (i.e., $T_3-T_2$). The base station may receive the uplink reference signal at time $T_{41}$ and the radio frequency front end of the base station may receive the uplink reference signal at time $T_4$. The base station may measure the time of arrival for the uplink reference signal at time $T_4$ and determine a gNB measurement report $T_{Tx \to Rx}$ based on a time difference between transmitting a downlink reference signal and receiving an uplink reference signal. In some cases, the gNB measurement report $T_{Tx \to Rx}$ may be based on a relative downlink/uplink frame timing and specification location for the uplink reference signal. In some cases, the UE may experience group delay due to the presence of the radio frequency front end. In some cases, the UE may calibrate the radio frequency front end group delays and compensate for the radio frequency front end. In such cases, the UE measurement report may indicate the group delay associated with the radio frequency front end. The base station may then calculate a distance from the UE by subtracting the calibrated radio frequency front end group delays.

Figure 4:
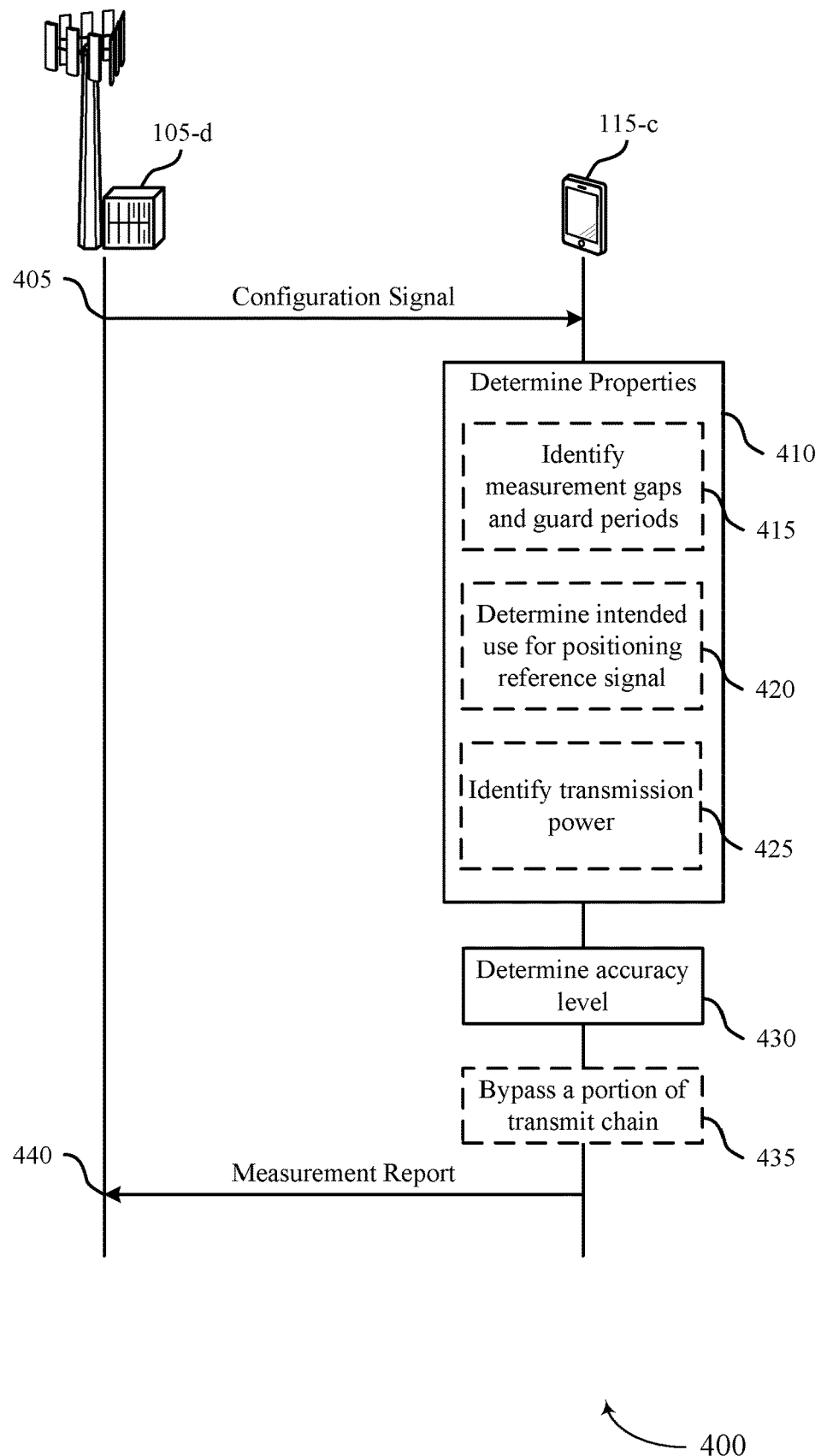
FIG. 4 illustrates an example of a process flow that supports group delay timing accuracy for positioning in NR in accordance with aspects of the present disclosure.

FIG. 4 illustrates an example of a process flow 400 that supports group delay timing accuracy for positioning in NR in accordance with aspects of the present disclosure. In some examples, the process flow 400 may implement aspects of wireless communications system 100. The process flow 400 may include base station 105-*d* and UE 115-*c*, which may be examples of the corresponding devices described with reference to FIGS. 1 through 3. UE 115-*c* and base station 105-*d* may support accuracy level determination for various timing measurements in NR.

In the following description of the process flow 400, the operations between UE 115-*c* and base station 105-*d* may be transmitted in a different order than the exemplary order shown. The operations performed by UE 115-*c* or base station 105-*d* may be performed in different orders or at different times than the exemplary order shown. Some operations may also be left out of the process flow 400, or other operations may be added to the process flow 400. Further, UE 115-*c* and base station 105-*d* are not meant to be representative, as the described features may be associated with any number of devices.

At 405, base station 105-d may transmit a configuration signal indicating a configuration for a positioning reference signal. The UE 115-c may receive the configuration signal via higher-layer signaling (such as RRC signaling). In some cases, the configuration signal may indicate one or more properties associated with the positioning reference signal.

At 410, the UE 115-c may determine one or more properties associated with the positioning reference signal based on the configuration signal. As depicted in the example of FIG. 4, the UE 115-c may optionally determine multiple properties associated with the positioning reference signal in order to determine an accuracy level associated with timing measurements.

At 415, the UE 115-c may optionally identify one or more measurement gaps associated with at least one scheduled transmission of a positioning reference signal (such as an uplink positioning reference signal). Additionally or alternatively, the UE 115-c may identify one or more guard periods associated with at least one scheduled transmission of the positioning reference signal. In some cases, the UE 115-c may determine that the one or more measurement gaps and the one or more guard periods are scheduled before the positioning reference signal, after the positioning reference signal, or any combination thereof.

At 420, the UE 115-c may determine an intended use of the reference signal (such as the positioning reference signal). In some examples, the UE 115-c may receive an indication (such as included in the configuration signal) for the intended use of the positioning reference signal. For example, the base station 105-d may indicate the intended use of the positioning reference signal in the configuration signal. In some examples, the base station 105-d may use one or more bits to indicate the intended use of the positioning reference signal.

In some cases, the UE 115-c may identify, based on the configuration signal, whether the positioning reference signal is intended for performing positioning measurements, performing communications, or any combination thereof. Additionally or alternatively, the UE 115-c may determine an intended use of a reference signal based on determining whether the reference signal is a positioning reference signal. In some cases, the UE 115-c may determine that a reference signal is intended for performing measurements if the reference signal is a positioning reference signal. Alternatively, the UE 115-c may identify that the positioning reference signal is intended for performing the positioning measurements and the communications. In some examples, the positioning reference signal may include a sounding reference signal.

At 425, the UE 115-c may determine whether a transmission power associated with the positioning reference signal satisfies a threshold. In some cases, the identifying is based on the configuration signal. In some examples, the UE 115-c may identify that the transmission power associated with the positioning reference signal satisfies the threshold. Alternatively, the UE 115-c may determine that the transmission power associated with the positioning reference signal does not satisfy the threshold. In some cases, the UE 115-c may report a UE capability to the base station 105-d. In some cases, the UE capability may be associated with a frequency band, a combination of frequency bands, or both. In such examples, the threshold may be based on the UE capability.

At 430, the UE 115-c may determine an accuracy level associated with one or more timing measurements based on the one or more properties associated with the positioning reference signal. In some cases, the UE 115-c may identify (such as receive, obtain, or otherwise identify) the one or more timing measurements prior to determining the accuracy level. For example, the UE 115-c may determine an accuracy level associated with a transmission timing for the positioning reference signal, an accuracy level associated with a reception timing for the positioning reference signal, an accuracy level associated with a time difference between a reception of the positioning reference signal and a transmission of a second positioning reference signal, or any combination thereof.

At 435, the UE 115-c may optionally bypass at least one portion of a transmit chain associated with the scheduled transmission of the reference signal (such as the positioning reference signal). In some cases, bypassing the at least one portion of the transmit chain is based on identifying the one or more measurement gaps and the one or more guard periods. Additionally or alternatively, the UE 115-c may bypass at least one portion of a transmit chain associated with the scheduled transmission of the positioning reference signal based on identifying that the positioning reference signal is intended for performing the positioning measurements. Additionally or alternatively, the UE 115-c may bypass at least one portion of a transmit chain associated with a scheduled transmission of the positioning reference signal based on identifying that the transmission power associated with the positioning reference signal satisfies the threshold. In some cases, the UE 115-c may bypass one or more components that are part of the transmit chain. For example, the one or more components may include one or more filters (such as surface acoustic wave filters), one or more power amplifiers, or any combination thereof.

At 440, the UE 115-c may transmit a measurement report associated with the positioning reference signal. In some cases, the measurement report may be related to the accuracy level associated with the one or more timing measurements.

Figure 8:
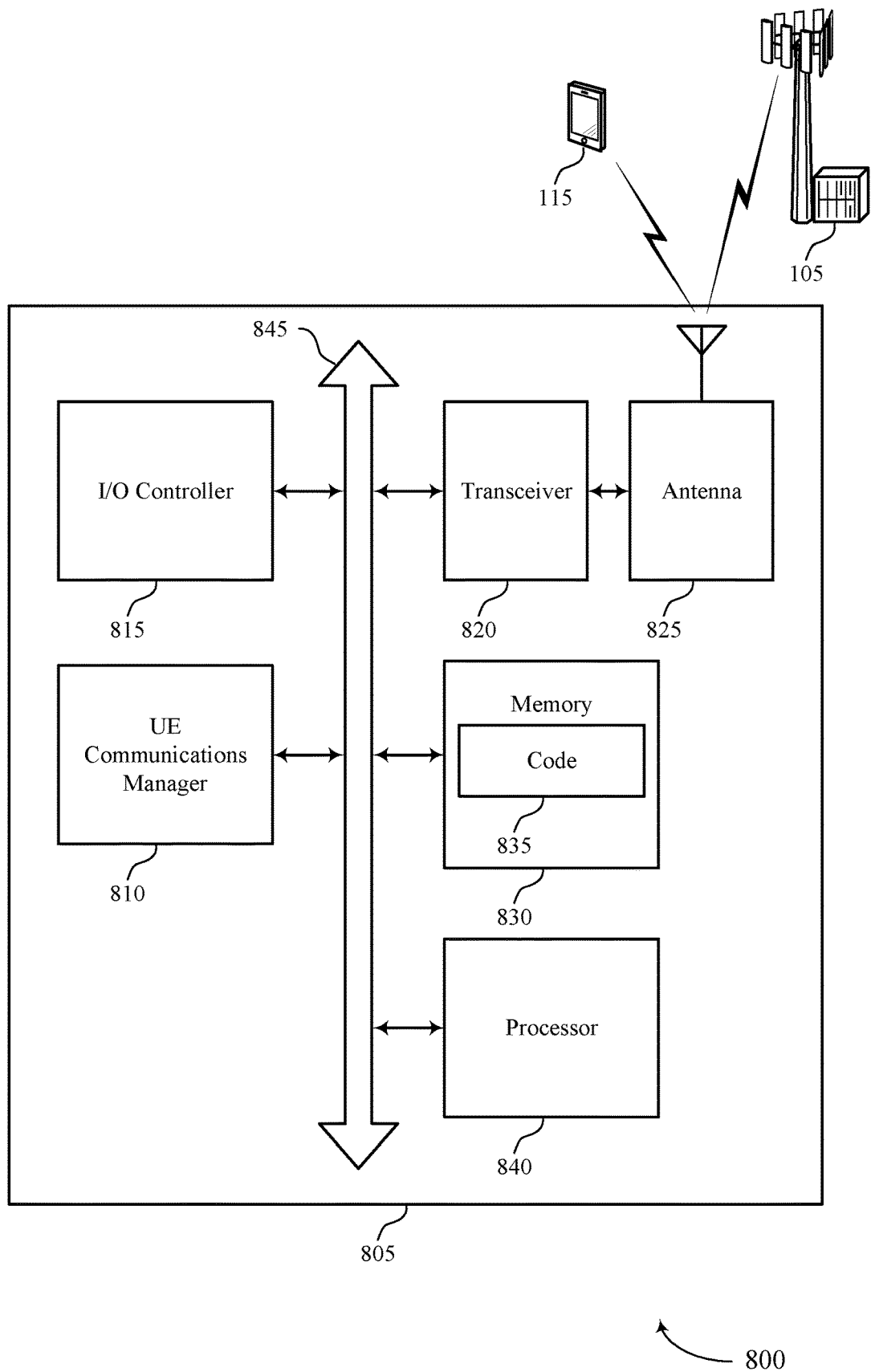
FIG. 8 shows a diagram of a system including a device that supports group delay timing accuracy for positioning in NR in accordance with aspects of the present disclosure.

FIG. 5 shows a block diagram 500 of a device 505 that supports group delay timing accuracy for positioning in NR in accordance with aspects of the present disclosure. The device 505 may be an example of aspects of a UE 115 as described herein. The device 505 may include a receiver 510, a UE communications manager 515, and a transmitter 520. The device 505 may also include a processor. In one example, the device 505 may be an example of an embodiment of system 800 as depicted in the example of FIG. 8. Additionally or alternatively, the device 505 may be an example of a portion of the system 800. Each of these components may be in communication with one another (e.g., via one or more buses). In some examples, the receiver 510 and the transmitter 520 may be implemented separately or in integrated transceiver hardware/software.

The receiver 510 may include an Rx processor 525, a MIMO detector 530, a filter 535, and a power amplifier 540. The receiver 510 may receive information such as packets, user data, or control information associated with various information channels (e.g., control channels, data channels, and information related to group delay timing accuracy for positioning in NR, etc.). Information may be passed on to other components of the device 505. The receiver 510 may be an example of aspects of the transceiver 820 described with reference to FIG. 8. The receiver 510 may utilize a single antenna or a set of antennas. Each of these subcomponents of the receiver 510 may be in communication with one another (e.g., via one or more buses). The receiver 510, or its sub-components, may be physically located at various positions, including being distributed such that portions of functions are implemented at different physical locations by one or more physical components. In some examples, the receiver 510, or its sub-components, may be a separate and distinct component in accordance with various aspects of the present disclosure.

The receiver 510 may receive the downlink signals from a base station (such as base station 105) and may provide the received signals to one or more demodulators (not shown). In some cases, the demodulator may be included in the Rx processor 525. A demodulator may condition (e.g., filter, amplify, downconvert, and digitize) a respective received signal to obtain input samples, and process the input samples (e.g., for OFDM, etc.) to obtain received symbols. A MIMO detector 530 may obtain received symbols from all the Rx processor 525, perform MIMO detection on the received symbols if applicable, and provide detected symbols. The Rx processor 525 may further process (e.g., demodulate, deinterleave, and decode) the detected symbols, providing decoded data for the UE to a data output, and providing decoded control information to the UE communications manager 515.

The UE communications manager 515 may receive a configuration signal indicating a configuration for a positioning reference signal. For example, the UE communications manager 515 may receive the configuration signal through the receiver 510. The UE communications manager 515 may determine one or more properties associated with the positioning reference signal based on the configuration signal, determine or otherwise identify one or more timings associated with the positioning reference signal. In one example, the UE communications manager 515 may bypass the filter 535 and/or power amplifier 540 associated with a scheduled reception of a positioning reference signal. Additionally or alternatively, the UE communications manager 515 may bypass the filter 555 and/or power amplifier 560 associated with a scheduled transmission of a positioning reference signal. In some cases, the UE communications manager 515 may decide to bypass the filter based on the one or more properties. The UE communications manager 515 may then determine an accuracy level associated with one or more timing measurements based on determining the one or more timings associated with the positioning reference signal and the one or more properties associated with the positioning reference signal. The UE communications manager 515 in conjunction with the transmitter 520 may transmit a measurement report associated with the positioning reference signal, where the measurement report is related to the accuracy level associated with the one or more timing measurements. In one example, the accuracy level or an accuracy approximation for the one or more timing measurements may be included in the measurement report. The UE communications manager 515 may be an example of aspects of the UE communications manager 810 described herein.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure. It may be understood that the UE communications manager 515, or its sub-components, may be implemented without a modem baseband or a processor. The UE communications manager 515, or its sub-components, may be implemented using a transceiver, a sensor core, an application processor, or any combination thereof. Additionally or alternatively, one or more components included in the UE communications manager 515 may be implemented in the transceiver, the sensor core, the application processor, or any combination thereof. According to one or more aspects of the present disclosure, the one or more components included in the UE communications manager 515 may indicate the UE communications manager 515 to bypass at least one portion of a transmit chain associated with a scheduled transmission of the positioning reference signal.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or any combination thereof in accordance with various aspects of the present disclosure.

The transmitter 520 may include an Tx processor 545, a Tx MIMO detector 550, a filter 555, and a power amplifier 560. The transmitter 520 may transmit signals generated by other components of the device 505 (such as UE communications manager 515). In some examples, the transmitter 520 may be collocated with a receiver 510 in a transceiver module. For example, the transmitter 520 may be an example of aspects of the transceiver 820 described with reference to FIG. 8. The transmitter 520 may utilize one or more antennas. Each of these sub-components of the transmitter 520 may be in communication with one another (e.g., via one or more buses). The transmitter 520, or its sub-components, may be physically located at various positions, including being distributed such that portions of functions are implemented at different physical locations by one or more physical components. In some examples, the transmitter 520, or its sub-components, may be a separate and distinct component in accordance with various aspects of the present disclosure.

In some cases, the Tx processor 545 may receive and process data from a data source. In some cases, the data source may be a positioning reference signal transmitted from the UE communications manager 515. The Tx processor 545 may also generate reference symbols for the reference signal. The symbols from the Tx processor 545 may be precoded by a Tx MIMO processor. In some cases, the Tx MIMO processor may be included in the Tx processor 545. The symbols may then be transmitted to a base station.

FIG. 6 shows a block diagram 600 of a device 605 that supports group delay timing accuracy for positioning in NR in accordance with aspects of the present disclosure. The device 605 may be an example of aspects of a device 505, or a UE 115 as described herein. The device 605 may include a receiver 610, a UE communications manager 615, and a transmitter 640. The device 605 may also include a processor. In one example, the device 605 may be an example of an embodiment of system 800 as depicted in the example of FIG. 8. Additionally or alternatively, the device 605 may be an example of a portion of the system 800. Each of these components may be in communication with one another (e.g., via one or more buses). In some examples, the receiver 610 and the transmitter 640 may be implemented separately or in integrated transceiver hardware/software.

The receiver 610 may receive information such as packets, user data, or control information associated with various information channels (e.g., control channels, data channels, and information related to group delay timing accuracy for positioning in NR, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a configuration signal component 620, a properties component 625, an accuracy level component 630, and a measurement report component 635. The UE communications manager 615 may be an example of aspects of the UE communications manager 810 described herein.

The configuration signal component 620 may receive a configuration signal indicating a configuration for a positioning reference signal. The properties component 625 may determine one or more properties associated with the positioning reference signal based on the configuration signal. The accuracy level component 630 may determine one or more timings associated with the positioning reference signal, and determine an accuracy level associated with one or more timing measurements based on determining the one or more timings and the one or more properties associated with the positioning reference signal. The measurement report component 635 may transmit a measurement report associated with the positioning reference signal, where the measurement report is related to the accuracy level associated with the one or more timing measurements.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize one or more antennas.

FIG. 7 shows a block diagram 700 of a UE communications manager 705 that supports group delay timing accuracy for positioning in NR in accordance with aspects of the present disclosure. The UE communications manager 705 may be an example of aspects of a UE communications manager 515, a UE communications manager 615, or a UE communications manager 810 described herein. The UE communications manager 705 may include a configuration signal component 710, a properties component 715, an accuracy level component 720, a measurement report component 725, a measurement gap component 730, a bypassing component 735, an identification component 740, a simultaneous transmission identification component 745, a transmission power component 750, a reporting component 755, a duration component 760, a bandwidth component 765, and a sub-band location component 770. Each of these modules may communicate, directly or indirectly, with one another (e.g., via one or more buses).

The configuration signal component 710 may receive a configuration signal indicating a configuration for a positioning reference signal. The configuration signal component 710 may determine a second configuration for a second positioning reference signal. The properties component 715 may determine one or more properties associated with the positioning reference signal based on the configuration signal. The properties component 715 may determine one or more properties associated with the second positioning reference signal based on the second configuration. The accuracy level component 720 may determine one or more timings associated with the positioning reference signal, and determine an accuracy level associated with one or more timing measurements based on determining the one or more timings and the one or more properties associated with the positioning reference signal. The accuracy level component 720 may determine a second accuracy level associated with a timing difference between a reception of the positioning reference signal and a transmission of the second positioning reference signal, where a timing of reception of the positioning reference signal is based on identifying the one or more timing measurements associated with the positioning reference signal, and where a measurement report is related to the second accuracy level.

In some cases, the one or more timing measurements include a group delay timing measurement, a transmission timing measurement, a reception timing measurement, or any combination thereof. In some cases, the group delay timing measurement may be associated with a reception of the positioning reference signal and a transmission of a second positioning reference signal. In some cases, the accuracy level associated with the one or more timing measurements is different for a first frequency range and a second frequency range. The measurement report component 725 may transmit a measurement report associated with the positioning reference signal, where the measurement report is related to the accuracy level associated with the one or more timing measurements.

In some examples, the accuracy level component 720 may determine, based on the one or more properties associated with the positioning reference signal, an accuracy level associated with a transmission timing for a second positioning reference signal, an accuracy level associated with a reception timing for the positioning reference signal, an accuracy level associated with a time difference between a reception of the positioning reference signal and a transmission of the second positioning reference signal, or any combination thereof.

In some examples, the accuracy level component 720 may determine a second accuracy level associated with the one or more timing measurements based on the identifying, where the accuracy level associated with the one or more timing measurements is greater than the second accuracy level associated with the one or more timing measurements.

The measurement gap component 730 may identify one or more measurement gaps, one or more guard periods associated with a scheduled transmission of the positioning reference signal, or a combination thereof, where the one or more measurement gaps and the one or more guard periods are scheduled before the positioning reference signal, after the positioning reference signal, or any combination thereof. In some examples, determining the accuracy level further includes determining the accuracy level based on identifying the one or more measurement gaps, the one or more guard periods, or a combination thereof.

The bypassing component 735 may bypass at least one portion of a transmit chain associated with the scheduled transmission of the positioning reference signal or a receive chain associated with a scheduled reception of a second positioning reference signal, where bypassing the at least one portion of the transmit chain or the receive chain is based on identifying the one or more measurement gaps and the one or more guard periods. In some cases, identifying one or more timings associated with the second positioning reference signal may include identifying one or more timing measurements associated with the second positioning reference signal. In some cases, the at least one portion of the transmit chain or the receive chain includes a surface acoustic wave filter. In some cases, the positioning reference signal includes an uplink positioning reference signal and the second positioning reference signal includes a downlink positioning reference signal.

The identification component 740 may identify, based on the configuration signal, whether the positioning reference signal is intended for performing positioning measurements, performing communications, or any combination thereof, where the accuracy level associated with the one or more timing measurements is based on the identifying. In some examples, the bypassing component 735 may bypass at least one portion of a transmit chain associated with a scheduled transmission of the positioning reference signal, where the accuracy level associated with the one or more timing measurements is based on bypassing the at least one portion of the transmit chain.

In some examples, the identification component 740 may identify that the positioning reference signal is intended for performing the positioning measurements. In some examples, the identification component 740 may identify that the positioning reference signal is intended for performing the positioning measurements and the communications. In some cases, the positioning reference signal includes a sounding reference signal.

The simultaneous transmission identification component 745 may identify, based on the configuration signal, whether the positioning reference signal is simultaneously transmitted with a channel, where the channel is in a same component carrier as the positioning reference signal or a different component carrier as the positioning reference signal, where the accuracy level associated with the one or more timing measurements is based on the identifying.

The transmission power component 750 may identify, based on the configuration signal, whether a transmission power associated with the positioning reference signal satisfies a threshold, where the accuracy level associated with the one or more timing measurements is based on the identifying.

In some examples, the transmission power component 750 may identify that the transmission power associated with the positioning reference signal satisfies the threshold. In some examples, the transmission power component 750 may identify that the transmission power associated with the positioning reference signal does not satisfy the threshold. In some examples, the bypassing component 735 may bypass, based on determining that the duration of the positioning reference signal satisfies the threshold, at least one portion of a transmit chain associated with a scheduled transmission of the positioning reference signal, where the accuracy level associated with the one or more timing measurements is based on bypassing the at least one portion of the transmit chain.

The reporting component 755 may report, to a base station, a UE capability associated with a frequency band, a combination of frequency bands, or both, where the threshold is based on the UE capability. The duration component 760 may identify, based on the configuration signal, a duration of the positioning reference signal during a period of time. In some examples, the duration component 760 may determine whether the duration of the positioning reference signal satisfies a threshold. In some cases, the duration of the positioning reference signal includes a number of symbols and the period of time includes 1 ms.

The bandwidth component 765 may identify, based on the configuration signal, a bandwidth associated with the positioning reference signal. In some examples, the bandwidth component 765 may determine that the bandwidth associated with the positioning reference signal satisfies a positioning reference signal bandwidth threshold, where the accuracy level associated with the one or more timing measurements is non-proportional to the bandwidth associated with the positioning reference signal. In some examples, the bandwidth component 765 may report, to a base station, a UE capability associated with a frequency band, a combination of frequency bands, or both, where the positioning reference signal bandwidth threshold is based on the UE capability.

The sub-band location component 770 may identify, based on the configuration signal, a location of a sub-band associated with a scheduled transmission of the positioning reference signal, where the accuracy level associated with the one or more timing measurements is based on the location of the sub-band. In some examples, the sub-band location component 770 may report, to a base station, a UE capability associated with the positioning reference signal, where the location of the sub-band associated with the scheduled transmission of the positioning reference signal is based on the UE capability. In some cases, an accuracy associated with the sub-band located at a center of a frequency band is greater than an accuracy associated with the sub-band located at an edge of the frequency band.

FIG. 8 shows a diagram of a system 800 including a device 805 that supports group delay timing accuracy for positioning in NR in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may receive a configuration signal indicating a configuration for a positioning reference signal, determine one or more properties associated with the positioning reference signal based on the configuration signal, determine one or more timings associated with the positioning reference signal, determine an accuracy level associated with one or more timing measurements based on determining the one or more timings and the one or more properties associated with the positioning reference signal, and transmit a measurement report associated with the positioning reference signal, where the measurement report is related to the accuracy level associated with the one or more timing measurements.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting group delay timing accuracy for positioning in NR).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

FIG. 9 shows a block diagram 900 of a device 905 that supports group delay timing accuracy for positioning in NR in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to group delay timing accuracy for positioning in NR, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may transmit, to a UE, a configuration signal indicating a configuration for a positioning reference signal, indicate one or more properties associated with the positioning reference signal using the configuration signal, where an accuracy level associated with one or more timing measurements is determined based on the one or more properties associated with the positioning reference signal, and receive a measurement report associated with the positioning reference signal, where the measurement report is related to the accuracy level associated with the one or more timing measurements. The base station communications manager 915 may be an example of aspects of the base station communications manager 1310 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an input/output (I/O) component, a transceiver, a network server, another computing device, one or more other components described in the present disclosure, or any combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

FIG. 10 shows a block diagram 1000 of a device 1005 that supports group delay timing accuracy for positioning in NR in accordance with aspects of the present disclosure. The device 1005 may be an example of aspects of a device 905, or a base station 105 as described herein. The device 1005 may include a receiver 1010, a base station communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to group delay timing accuracy for positioning in NR, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a configuration signal component 1020, a properties component 1025, and a measurement report component 1030. The base station communications manager 1015 may be an example of aspects of the base station communications manager 1310 described herein.

The configuration signal component 1020 may transmit, to a UE, a configuration signal indicating a configuration for a positioning reference signal. The properties component 1025 may indicate one or more properties associated with the positioning reference signal using the configuration signal, where an accuracy level associated with one or more timing measurements is determined based on the one or more properties associated with the positioning reference signal. The measurement report component 1030 may receive a measurement report associated with the positioning reference signal, where the measurement report is related to the accuracy level associated with the one or more timing measurements.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

FIG. 11 shows a block diagram 1100 of a base station communications manager 1105 that supports group delay timing accuracy for positioning in NR in accordance with aspects of the present disclosure. The base station communications manager 1105 may be an example of aspects of a base station communications manager 915, a base station communications manager 1015, or a base station communications manager 1310 described herein. The base station communications manager 1105 may include a configuration signal component 1110, a properties component 1115, a measurement report component 1120, a scheduling component 1125, a bypassing component 1130, an indication component 1135, and a capability component 1140. Each of these modules may communicate, directly or indirectly, with one another (e.g., via one or more buses).

The configuration signal component 1110 may transmit, to a UE, a configuration signal indicating a configuration for a positioning reference signal. The properties component 1115 may indicate one or more properties associated with the positioning reference signal using the configuration signal, where an accuracy level associated with one or more timing measurements is determined based on the one or more properties associated with the positioning reference signal. In some cases, the one or more timing measurements include a group delay timing measurement, a transmission timing measurement, a reception timing measurement, or any combination thereof. In some cases, the group delay timing measurement may be associated with a reception of the positioning reference signal and a transmission of a second positioning reference signal. In some cases, the accuracy level associated with the one or more timing measurements is different for a first frequency range and a second frequency range. The measurement report component 1120 may receive a measurement report associated with the positioning reference signal, where the measurement report is related to the accuracy level associated with the one or more timing measurements.

The scheduling component 1125 may schedule one or more measurement gaps, one or more guard periods associated with a scheduled transmission of the positioning reference signal, or a combination thereof, where the one or more measurement gaps and the one or more guard periods are scheduled before the positioning reference signal, after the positioning reference signal, or any combination thereof, and where the accuracy level is based on scheduling the one or more measurement gaps, the one or more guard periods, or a combination thereof.

The bypassing component 1130 may configure the UE to bypass at least one portion of a transmit chain associated with the scheduled transmission of the positioning reference signal or a receive chain associated with a scheduled reception of a second positioning reference signal, where bypassing the at least one portion of the transmit chain or the receive chain is based on scheduling the one or more measurement gaps and the one or more guard periods. In some cases, the at least one portion of the transmit chain or the receive chain includes a surface acoustic wave filter. In some cases, the positioning reference signal includes an uplink positioning reference signal and the second positioning reference signal includes a downlink positioning reference signal.

The indication component 1135 may indicate, using the configuration signal, whether the positioning reference signal is intended for performing positioning measurements, performing communications, or any combination thereof. In some examples, the indication component 1135 may indicate that the positioning reference signal is intended for performing the positioning measurements. In some examples, the indication component 1135 may indicate, using the configuration signal, whether the positioning reference signal is simultaneously transmitted with a channel, where the channel is in a same component carrier as the positioning reference signal or a different component carrier as the positioning reference signal.

In some examples, the bypassing component 1130 may configure the UE to bypass at least one portion of a transmit chain associated with a scheduled transmission of the positioning reference signal, where the accuracy level associated with the one or more timing measurements is based on bypassing the at least one portion of the transmit chain. In some examples, the indication component 1135 may indicate, using the configuration signal, whether a transmission power associated with the positioning reference signal satisfies a threshold.

In some examples, the indication component 1135 may indicate, using the configuration signal, a duration of the positioning reference signal during a period of time, where the duration of the positioning reference signal includes a number of symbols and the period of time includes 1 ms. In some examples, the indication component 1135 may indicate, using the configuration signal, a bandwidth associated with the positioning reference signal.

In some examples, the indication component 1135 may indicate, using the configuration signal, a location of a sub-band associated with a scheduled transmission of the positioning reference signal, where an accuracy associated with the sub-band located at a center of a frequency band is greater than an accuracy associated with the sub-band located at an edge of the frequency band. In some cases, the positioning reference signal includes a sounding reference signal.

The capability component 1140 may receive, from the UE, a UE capability associated with a frequency band, a combination of frequency bands, or both, where the threshold is based on the UE capability. In some examples, the capability component 1140 may receive, from the UE, a UE capability associated with a frequency band, a combination of frequency bands, or both, where a positioning reference signal bandwidth threshold is based on the UE capability. In some examples, the capability component 1140 may receive, from the UE, a UE capability associated with the positioning reference signal, where the location of the sub-band associated with the scheduled transmission of the positioning reference signal is based on the UE capability.

Figure 12:
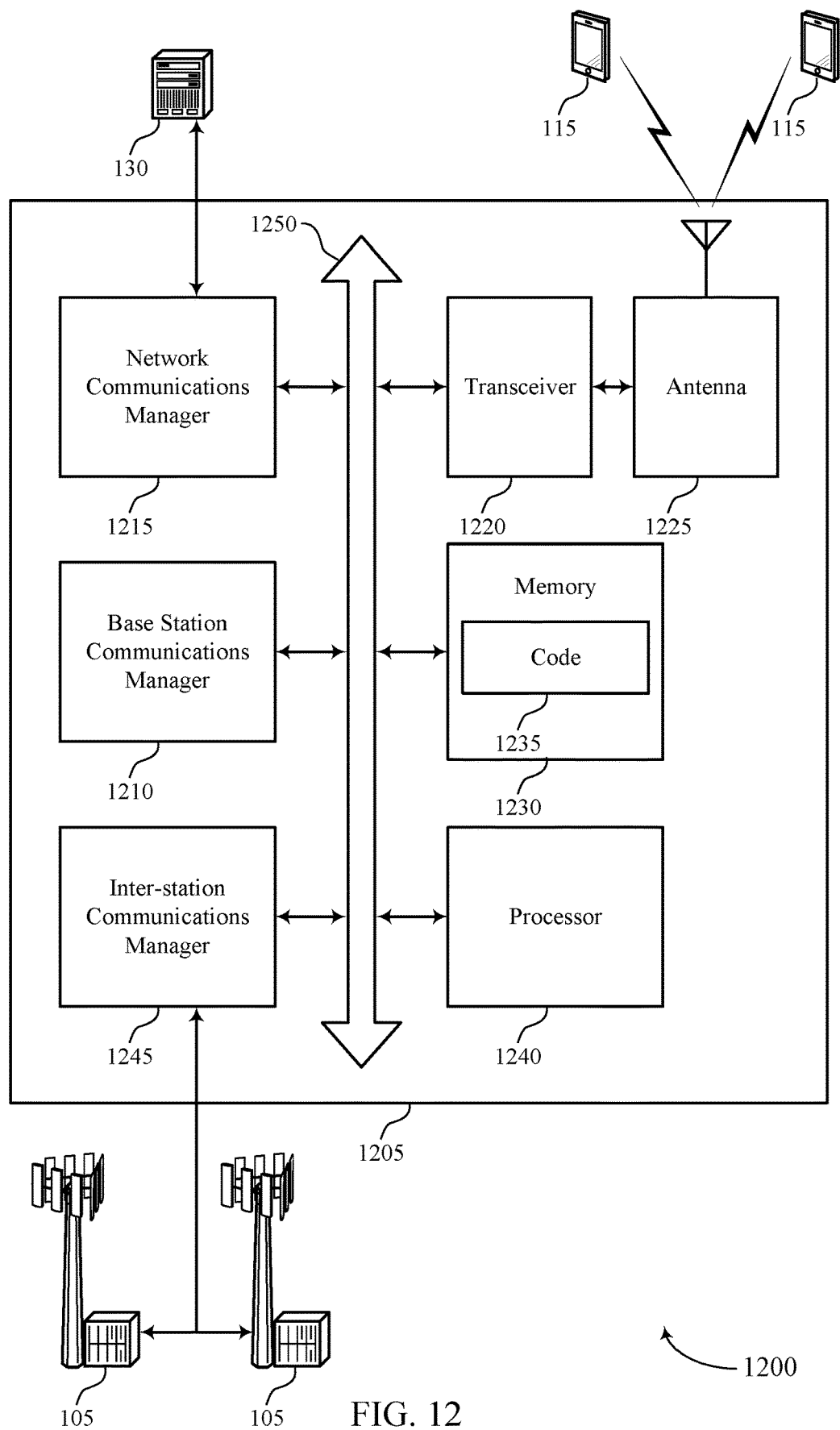
FIG. 12 shows a diagram of a system including a device that supports group delay timing accuracy for positioning in NR in accordance with aspects of the present disclosure.

FIG. 12 shows a diagram of a system 1200 including a device 1205 that supports group delay timing accuracy for positioning in NR in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may transmit, to a UE, a configuration signal indicating a configuration for a positioning reference signal, indicate one or more properties associated with the positioning reference signal using the configuration signal, where an accuracy level associated with one or more timing measurements is determined based on the one or more properties associated with the positioning reference signal, and receive a measurement report associated with the positioning reference signal, where the measurement report is related to the accuracy level associated with the one or more timing measurements.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the wireless device may include a single antenna 1225. However, in some cases the device may have more than one antenna 1225, which may be capable of concurrently transmitting or receiving multiple wireless transmissions.

The memory 1230 may include RAM, ROM, or any combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting group delay timing accuracy for positioning in NR).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
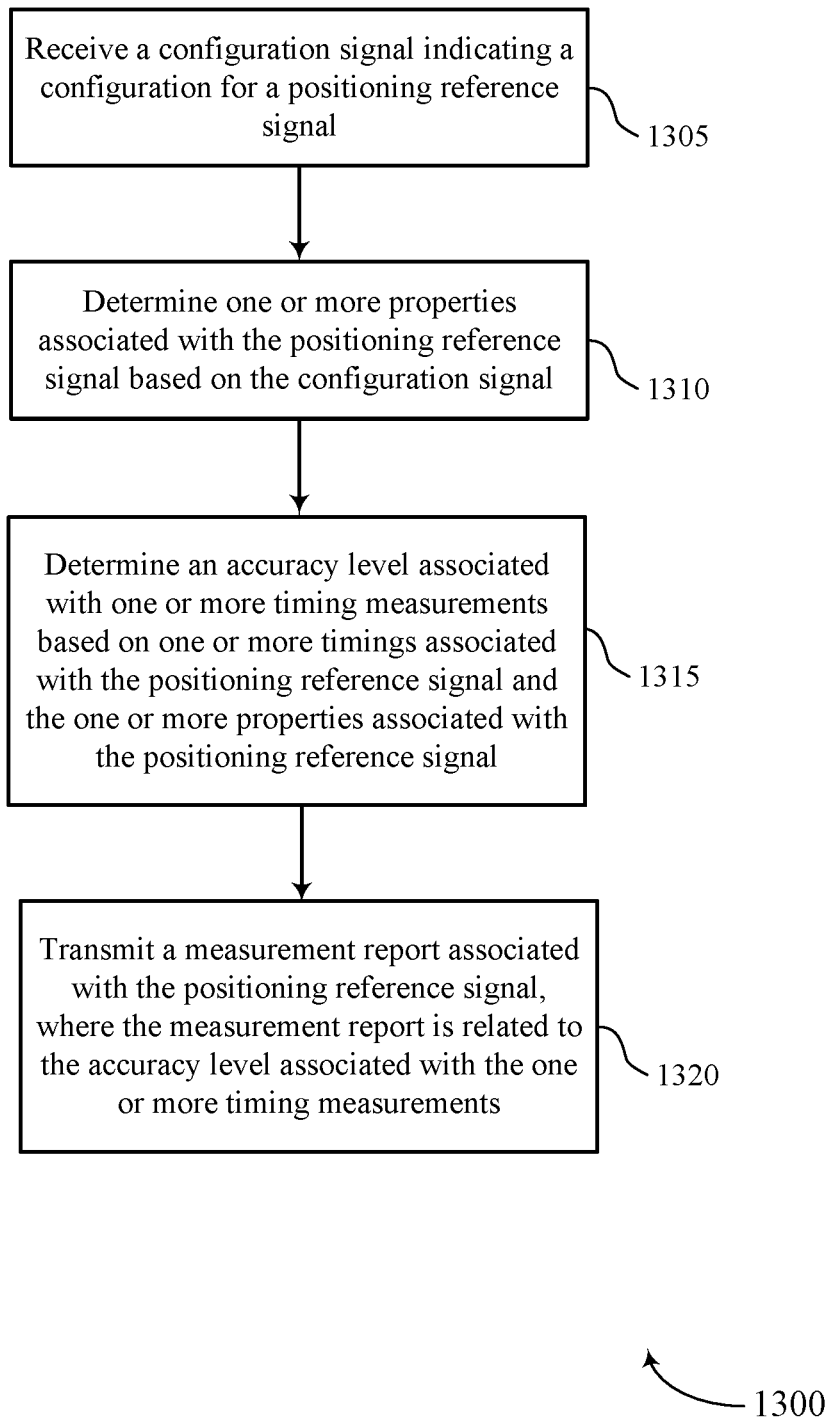
FIGS. 13 through 16 show flowcharts illustrating methods that support group delay timing accuracy for positioning in NR in accordance with aspects of the present disclosure.

FIG. 13 shows a flowchart illustrating a method 1300 that supports group delay timing accuracy for positioning in NR in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a configuration signal indicating a configuration for a positioning reference signal. The operations of 1305 may be performed according to the methods described herein. In some examples, aspects of the operations of 1305 may be performed by a configuration signal component as described with reference to FIGS. 5 through 8. Additionally, or alternatively, means for performing 1305 may, but not necessarily, include, for example, I/O controller 815, antenna 825, transceiver 820, UE communications manager 810, memory 830 (including code 835), processor 840 and/or bus 845.

At 1310, the UE may determine one or more properties associated with the positioning reference signal based on the configuration signal. The operations of 1310 may be performed according to the methods described herein. In some examples, aspects of the operations of 1310 may be performed by a properties component as described with reference to FIGS. 5 through 8. Additionally, or alternatively, means for performing 1310 may, but not necessarily, include, for example, I/O controller 815, antenna 825, transceiver 820, UE communications manager 810, memory 830 (including code 835), processor 840 and/or bus 845.

At 1315, the UE may determine an accuracy level associated with one or more timing measurements based on one or more timings associated with the positioning reference signal and the one or more properties associated with the positioning reference signal. In some cases, the UE may determine the one or more timings associated with the positioning reference signal prior to determining the accuracy level. The operations of 1315 may be performed according to the methods described herein. In some examples, aspects of the operations of 1315 may be performed by an accuracy level component as described with reference to FIGS. 5 through 8. Additionally, or alternatively, means for performing 1315 may, but not necessarily, include, for example, I/O controller 815, antenna 825, transceiver 820, UE communications manager 810, memory 830 (including code 835), processor 840 and/or bus 845.

At 1320, the UE may transmit a measurement report associated with the positioning reference signal, where the measurement report is related to the accuracy level associated with the one or more timing measurements. The operations of 1320 may be performed according to the methods described herein. In some examples, aspects of the operations of 1320 may be performed by a measurement report component as described with reference to FIGS. 5 through 8. Additionally, or alternatively, means for performing 1320 may, but not necessarily, include, for example, I/O controller 815, antenna 825, transceiver 820, UE communications manager 810, memory 830 (including code 835), processor 840 and/or bus 845.

Figure 14:
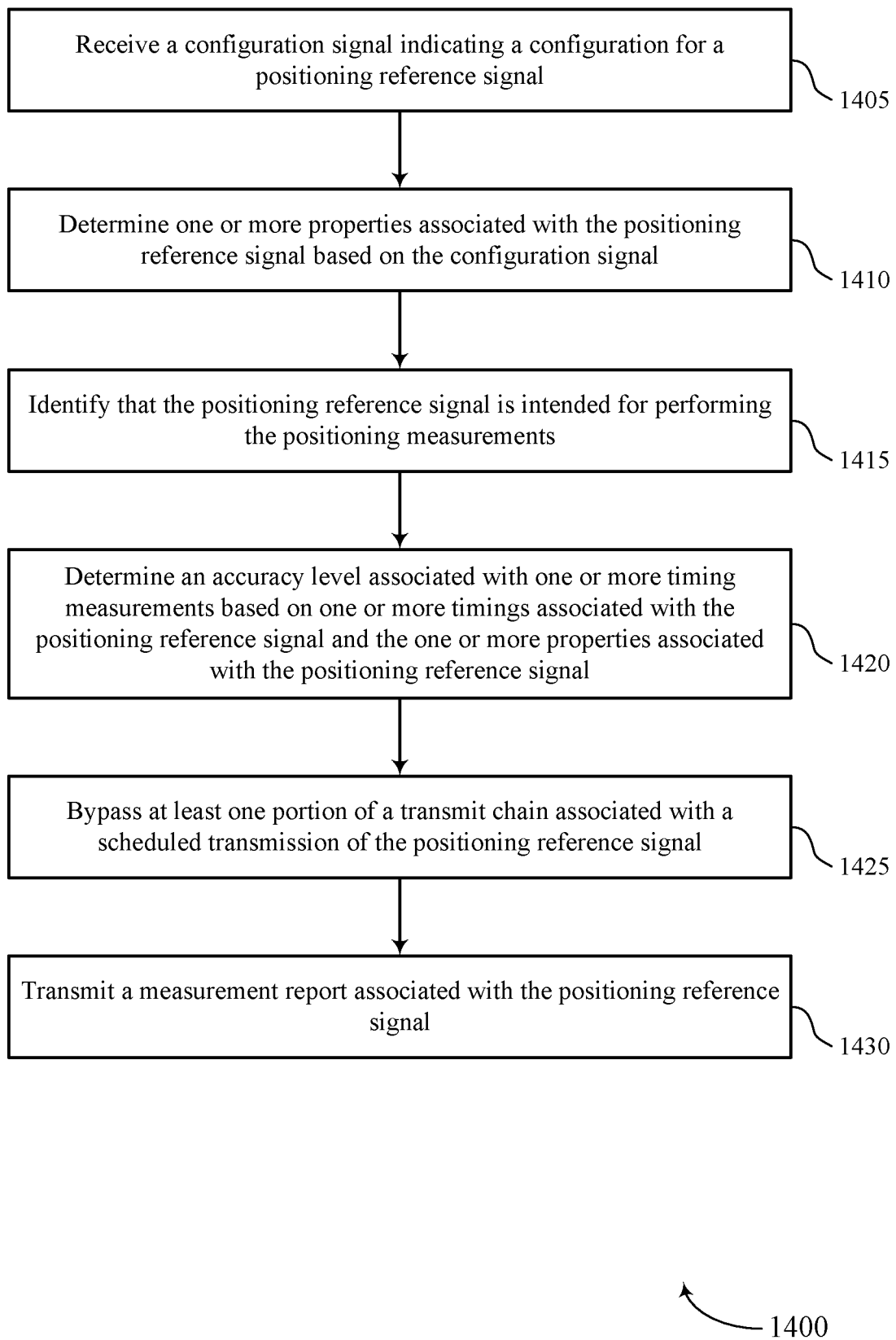

FIG. 14 shows a flowchart illustrating a method 1400 that supports group delay timing accuracy for positioning in NR in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a configuration signal indicating a configuration for a positioning reference signal. The operations of 1405 may be performed according to the methods described herein. In some examples, aspects of the operations of 1405 may be performed by a configuration signal component as described with reference to FIGS. 5 through 8. Additionally, or alternatively, means for performing 1405 may, but not necessarily, include, for example, I/O controller 815, antenna 825, transceiver 820, UE communications manager 810, memory 830 (including code 835), processor 840 and/or bus 845.

At 1410, the UE may determine one or more properties associated with the positioning reference signal based on the configuration signal. The operations of 1410 may be performed according to the methods described herein. In some examples, aspects of the operations of 1410 may be performed by a properties component as described with reference to FIGS. 5 through 8. Additionally, or alternatively, means for performing 1410 may, but not necessarily, include, for example, I/O controller 815, antenna 825, transceiver 820, UE communications manager 810, memory 830 (including code 835), processor 840 and/or bus 845.

At 1415, the UE may identify that the positioning reference signal is intended for performing the positioning measurements. The operations of 1415 may be performed according to the methods described herein. In some examples, aspects of the operations of 1415 may be performed by an identification component as described with reference to FIGS. 5 through 8. Additionally, or alternatively, means for performing 1415 may, but not necessarily, include, for example, I/O controller 815, antenna 825, transceiver 820, UE communications manager 810, memory 830 (including code 835), processor 840 and/or bus 845.

At 1420, the UE may determine an accuracy level associated with one or more timing measurements based on one or more timings associated with the positioning reference signal and the one or more properties associated with the positioning reference signal. The operations of 1420 may be performed according to the methods described herein. In some examples, aspects of the operations of 1420 may be performed by an accuracy level component as described with reference to FIGS. 5 through 8. Additionally, or alternatively, means for performing 1420 may, but not necessarily, include, for example, I/O controller 815, antenna 825, transceiver 820, UE communications manager 810, memory 830 (including code 835), processor 840 and/or bus 845.

At 1425, the UE may bypass at least one portion of a transmit chain associated with a scheduled transmission of the positioning reference signal. In some cases, the accuracy level associated with the one or more timing measurements is based on bypassing the at least one portion of the transmit chain. The operations of 1425 may be performed according to the methods described herein. In some examples, aspects of the operations of 1425 may be performed by a bypassing component as described with reference to FIGS. 5 through 8. Additionally, or alternatively, means for performing 1425 may, but not necessarily, include, for example, I/O controller 815, antenna 825, transceiver 820, UE communications manager 810, memory 830 (including code 835), processor 840 and/or bus 845.

At 1430, the UE may transmit a measurement report associated with the positioning reference signal. In some cases, the measurement report is related to the accuracy level associated with the one or more timing measurements. The operations of 1430 may be performed according to the methods described herein. In some examples, aspects of the operations of 1430 may be performed by a measurement report component as described with reference to FIGS. 5 through 8. Additionally, or alternatively, means for performing 1430 may, but not necessarily, include, for example, I/O controller 815, antenna 825, transceiver 820, UE communications manager 810, memory 830 (including code 835), processor 840 and/or bus 845.

Figure 15:
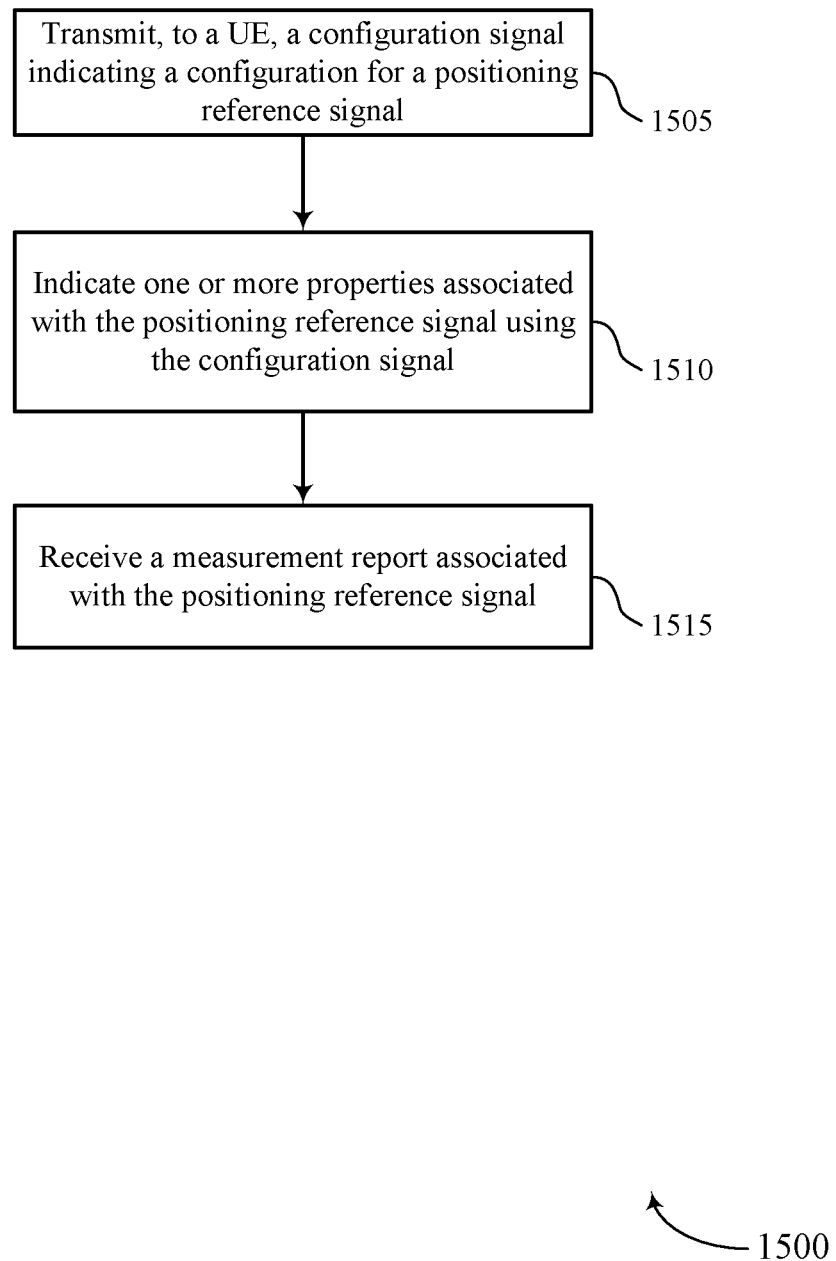

FIG. 15 shows a flowchart illustrating a method 1500 that supports group delay timing accuracy for positioning in NR in accordance with aspects of the present disclosure. The operations of method 1500 may be implemented by a base station 105 or its components as described herein. For example, the operations of method 1500 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may transmit, to a UE, a configuration signal indicating a configuration for a positioning reference signal. The operations of 1505 may be performed according to the methods described herein. In some examples, aspects of the operations of 1505 may be performed by a configuration signal component as described with reference to FIGS. 9 through 12. Additionally, or alternatively, means for performing 1505 may, but not necessarily, include, for example, network communications manager 1215, antenna 1225, transceiver 1220, base station communications manager 1210, memory 1230 (including code 1235), processor 1240, inter-station communications manager 1245, and/or bus 1255.

At 1510, the base station may indicate one or more properties associated with the positioning reference signal using the configuration signal. In some instances, an accuracy level associated with one or more timing measurements is determined based on the one or more properties associated with the positioning reference signal. The operations of 1510 may be performed according to the methods described herein. In some examples, aspects of the operations of 1510 may be performed by a properties component as described with reference to FIGS. 9 through 12. Additionally, or alternatively, means for performing 1210 may, but not necessarily, include, for example, network communications manager 1215, antenna 1225, transceiver 1220, base station communications manager 1210, memory 1230 (including code 1235), processor 1240, inter-station communications manager 1245, and/or bus 1255.

At 1515, the base station may receive a measurement report associated with the positioning reference signal. In some cases, the measurement report is related to the accuracy level associated with the one or more timing measurements. The operations of 1515 may be performed according to the methods described herein. In some examples, aspects of the operations of 1515 may be performed by a measurement report component as described with reference to FIGS. 9 through 12. Additionally, or alternatively, means for performing 1515 may, but not necessarily, include, for example, network communications manager 1215, antenna 1225, transceiver 1220, base station communications manager 1210, memory 1230 (including code 1235), processor 1240, inter-station communications manager 1245, and/or bus 1255.

Figure 16:
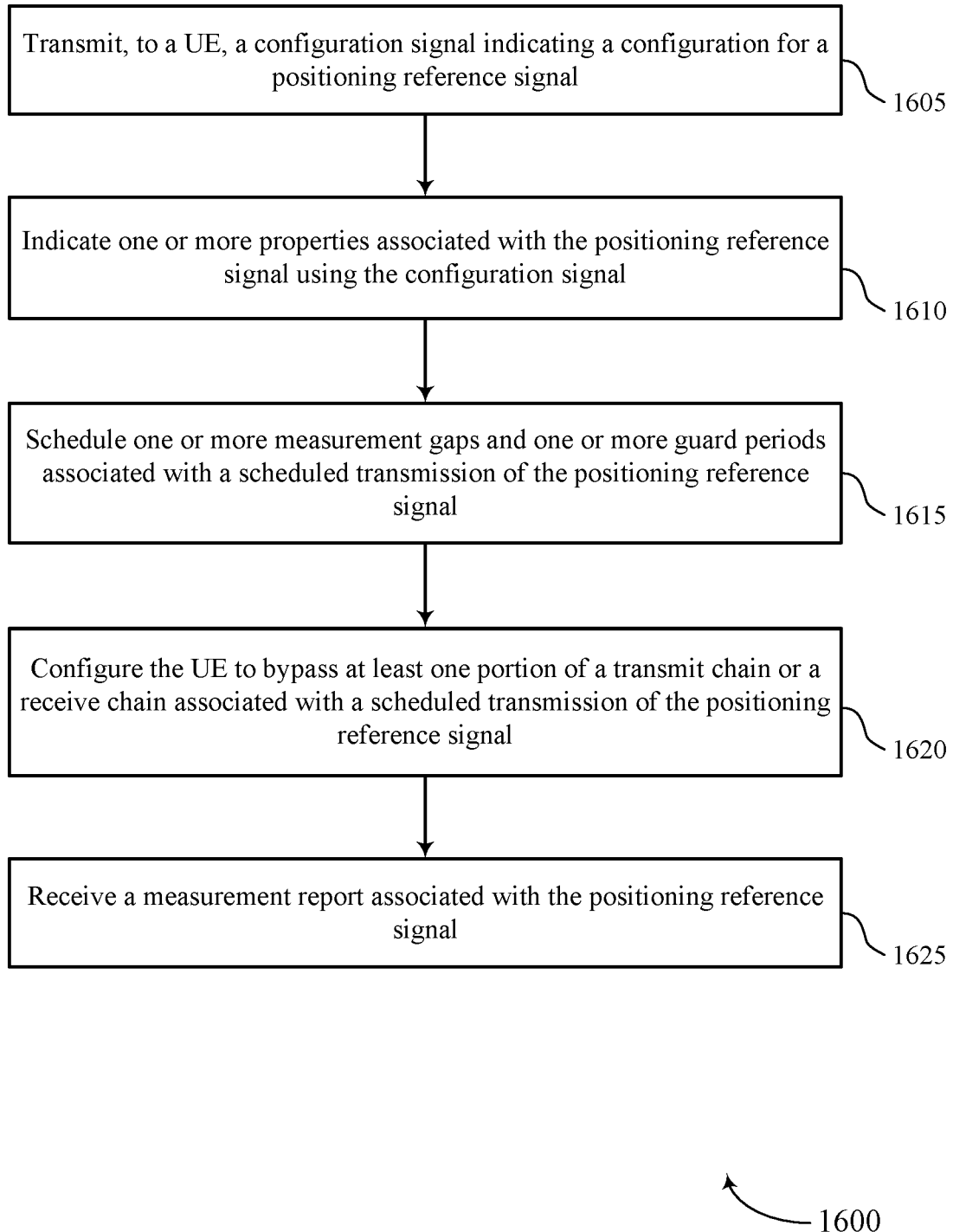

FIG. 16 shows a flowchart illustrating a method 1600 that supports group delay timing accuracy for positioning in NR in accordance with aspects of the present disclosure. The operations of method 1600 may be implemented by a base station 105 or its components as described herein. For example, the operations of method 1600 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, a configuration signal indicating a configuration for a positioning reference signal. The operations of 1605 may be performed according to the methods described herein. In some examples, aspects of the operations of 1605 may be performed by a configuration signal component as described with reference to FIGS. 9 through 12. Additionally, or alternatively, means for performing 1605 may, but not necessarily, include, for example, network communications manager 1215, antenna 1225, transceiver 1220, base station communications manager 1210, memory 1230 (including code 1235), processor 1240, inter-station communications manager 1245, and/or bus 1255.

At 1610, the base station may indicate one or more properties associated with the positioning reference signal using the configuration signal. In some cases, an accuracy level associated with one or more timing measurements is determined based on the one or more properties associated with the positioning reference signal. The operations of 1610 may be performed according to the methods described herein. In some examples, aspects of the operations of 1610 may be performed by a properties component as described with reference to FIGS. 9 through 12. Additionally, or alternatively, means for performing 1610 may, but not necessarily, include, for example, network communications manager 1215, antenna 1225, transceiver 1220, base station communications manager 1210, memory 1230 (including code 1235), processor 1240, inter-station communications manager 1245, and/or bus 1255.

At 1615, the base station may schedule one or more measurement gaps and one or more guard periods associated with a scheduled transmission of the positioning reference signal. In some cases, the one or more measurement gaps and the one or more guard periods are scheduled before the positioning reference signal, after the positioning reference signal, or any combination thereof. In some cases, the accuracy level is based on scheduling the one or more measurement gaps and the one or more guard periods. The operations of 1615 may be performed according to the methods described herein. In some examples, aspects of the operations of 1615 may be performed by a scheduling component as described with reference to FIGS. 9 through 12. Additionally, or alternatively, means for performing 1615 may, but not necessarily, include, for example, network communications manager 1215, antenna 1225, transceiver 1220, base station communications manager 1210, memory 1230 (including code 1235), processor 1240, inter-station communications manager 1245, and/or bus 1255.

At 1620, the base station may configure the UE to bypass at least one portion of a transmit chain associated with the scheduled transmission of the positioning reference signal or a receive chain associated with a scheduled reception of a second positioning reference signal. In some cases, bypassing the at least one portion of the transmit chain or the receive chain is based on scheduling the one or more measurement gaps and the one or more guard periods. The operations of 1620 may be performed according to the methods described herein. In some examples, aspects of the operations of 1620 may be performed by a bypassing component as described with reference to FIGS. 9 through 12. Additionally, or alternatively, means for performing 1620 may, but not necessarily, include, for example, network communications manager 1215, antenna 1225, transceiver 1220, base station communications manager 1210, memory 1230 (including code 1235), processor 1240, inter-station communications manager 1245, and/or bus 1255.

At 1625, the base station may receive a measurement report associated with the positioning reference signal. In some cases, the measurement report is related to the accuracy level associated with the one or more timing measurements. The operations of 1625 may be performed according to the methods described herein. In some examples, aspects of the operations of 1625 may be performed by a measurement report component as described with reference to FIGS. 9 through 12. Additionally, or alternatively, means for performing 1625 may, but not necessarily, include, for example, network communications manager 1215, antenna 1225, transceiver 1220, base station communications manager 1210, memory 1230 (including code 1235), processor 1240, inter-station communications manager 1245, and/or bus 1255.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous embodiments or aspects described herein.

Example 1: A method for wireless communication, by a user equipment (UE), comprising: receiving a configuration signal indicating a configuration for a positioning reference signal; determining one or more properties associated with the positioning reference signal based at least in part on the configuration signal; determining an accuracy level associated with one or more timing measurements based at least in part on one or more timings associated with the positioning reference signal and the one or more properties associated with the positioning reference signal; and transmitting a measurement report associated with the positioning reference signal, wherein the measurement report is related to the accuracy level associated with the one or more timing measurements.

Example 2: The method of example 1, further comprising: determining, based at least in part on the one or more properties associated with the positioning reference signal, an accuracy level associated with a transmission timing for a second positioning reference signal, an accuracy level associated with a reception timing for the positioning reference signal, an accuracy level associated with a time difference between a reception of the positioning reference signal and a transmission of the second positioning reference signal, or any combination thereof.

Example 3: The method of any of examples 1 or 2, further comprising: identifying one or more measurement gaps, one or more guard periods associated with a scheduled transmission of the positioning reference signal, or a combination thereof, wherein the one or more measurement gaps and the one or more guard periods are scheduled before the positioning reference signal, after the positioning reference signal, or any combination thereof; and wherein determining the accuracy level further comprises determining the accuracy level based at least in part on identifying the one or more measurement gaps, the one or more guard periods, or a combination thereof.

Example 4: The method of any of examples 1 to 3, further comprising: bypassing at least one portion of a transmit chain associated with the scheduled transmission of the positioning reference signal or a receive chain associated with a scheduled reception of a second positioning reference signal, wherein identifying one or more timings associated with the second positioning reference signal comprises identifying one or more timing measurements associated with the second positioning reference signal, and bypassing the at least one portion of the transmit chain or the receive chain is based at least in part on identifying the one or more measurement gaps and the one or more guard periods.

Example 5: The method of any of examples 1 to 4, wherein the at least one portion of the transmit chain or the receive chain comprises a surface acoustic wave filter.

Example 6: The method of any of examples 1 to 5, wherein the positioning reference signal comprises an uplink positioning reference signal and the second positioning reference signal comprises a downlink positioning reference signal.

Example 7: The method of any of examples 1 to 6, further comprising: identifying, based at least in part on the configuration signal, whether the positioning reference signal is intended for performing positioning measurements, performing communications, or any combination thereof, wherein the accuracy level associated with the one or more timing measurements is based at least in part on the identifying.

Example 8: The method of any of examples 1 to 7, further comprising: identifying that the positioning reference signal is intended for performing the positioning measurements; and bypassing at least one portion of a transmit chain associated with a scheduled transmission of the positioning reference signal, wherein the accuracy level associated with the one or more timing measurements is based at least in part on bypassing the at least one portion of the transmit chain.

Example 9: The method of any of examples 1 to 8, further comprising: further comprising: identifying that the positioning reference signal is intended for performing the positioning measurements and the communications; and determining a second accuracy level associated with the one or more timing measurements based at least in part on the identifying, wherein the accuracy level associated with the one or more timing measurements is greater than the second accuracy level associated with the one or more timing measurements.

Example 10: The method of any of examples 1 to 9, wherein the positioning reference signal comprises a sounding reference signal.

Example 11: The method of any of examples 1 to 10, further comprising: identifying, based at least in part on the configuration signal, whether the positioning reference signal is simultaneously transmitted with a channel, wherein the channel is in a same component carrier as the positioning reference signal or a different component carrier as the positioning reference signal, wherein the accuracy level associated with the one or more timing measurements is based at least in part on the identifying.

Example 12: The method of any of examples 1 to 11, further comprising: identifying, based at least in part on the configuration signal, whether a transmission power associated with the positioning reference signal satisfies a threshold, wherein the accuracy level associated with the one or more timing measurements is based at least in part on the identifying.

Example 13: The method of any of examples 1 to 12, further comprising: identifying that the transmission power associated with the positioning reference signal satisfies the threshold; and bypassing at least one portion of a transmit chain associated with a scheduled transmission of the positioning reference signal, wherein the accuracy level associated with the one or more timing measurements is based at least in part on bypassing the at least one portion of the transmit chain.

Example 14: The method of any of examples 1 to 12, further comprising: identifying that the transmission power associated with the positioning reference signal does not satisfy the threshold; and determining a second accuracy level associated with the one or more timing measurements based at least in part on the identifying, wherein the accuracy level associated with the one or more timing measurements is greater than the second accuracy level associated with the one or more timing measurements.

Example 15: The method of any of examples 1 to 14, further comprising: reporting, to a base station, a UE capability associated with a frequency band, a combination of frequency bands, or both, wherein the threshold is based at least in part on the UE capability.

Example 16: The method of any of examples 1 to 15, further comprising: identifying, based at least in part on the configuration signal, a duration of the positioning reference signal during a period of time; determining whether the duration of the positioning reference signal satisfies a threshold; and bypassing, based at least in part on determining that the duration of the positioning reference signal satisfies the threshold, at least one portion of a transmit chain associated with a scheduled transmission of the positioning reference signal, wherein the accuracy level associated with the one or more timing measurements is based at least in part on bypassing the at least one portion of the transmit chain.

Example 17: The method of any of examples 1 to 16, wherein the duration of the positioning reference signal comprises a number of symbols and the period of time comprises one millisecond.

Example 18: The method of any of examples 1 to 17, further comprising: identifying, based at least in part on the configuration signal, a bandwidth associated with the positioning reference signal; and determining that the bandwidth associated with the positioning reference signal satisfies a positioning reference signal bandwidth threshold, wherein the accuracy level associated with the one or more timing measurements is non-proportional to the bandwidth associated with the positioning reference signal.

Example 19: The method of any of examples 1 to 18, further comprising: reporting, to a base station, a UE capability associated with a frequency band, a combination of frequency bands, or both, wherein the positioning reference signal bandwidth threshold is based at least in part on the UE capability.

Example 20: The method of any of examples 1 to 19, further comprising: identifying, based at least in part on the configuration signal, a location of a sub-band associated with a scheduled transmission of the positioning reference signal, wherein the accuracy level associated with the one or more timing measurements is based at least in part on the location of the sub-band.

Example 21: The method of any of examples 1 to 20, wherein an accuracy associated with the sub-band located at a center of a frequency band is greater than an accuracy associated with the sub-band located at an edge of the frequency band.

Example 22: The method of any of examples 1 to 21, further comprising: reporting, to a base station, a UE capability associated with the positioning reference signal, wherein the location of the sub-band associated with the scheduled transmission of the positioning reference signal is based at least in part on the UE capability.

Example 23: The method of any of examples 1 to 22, further comprising: determining a second configuration for a second positioning reference signal; determining one or more properties associated with the second positioning reference signal based at least in part on the second configuration; and determining a second accuracy level associated with a timing difference between a reception of the positioning reference signal and a transmission of the second positioning reference signal, wherein a timing of reception of the positioning reference signal is based at least in part on identifying the one or more timing measurements associated with the positioning reference signal, and wherein the measurement report is related to the second accuracy level.

Example 24: The method of any of examples 1 to 23, wherein the one or more timing measurements comprise a group delay timing measurement, a transmission timing measurement, a reception timing measurement, or any combination thereof, the group delay timing measurement being associated with a reception of the positioning reference signal and a transmission of a second positioning reference signal.

Example 25: The method of any of examples 1 to 24, wherein the accuracy level associated with the one or more timing measurements is different for a first frequency range and a second frequency range.

Example 26: A method for wireless communication, comprising: transmitting, to a user equipment (UE), a configuration signal indicating a configuration for a positioning reference signal; indicating one or more properties associated with the positioning reference signal using the configuration signal, wherein an accuracy level associated with one or more timing measurements is determined based at least in part on the one or more properties associated with the positioning reference signal; and receiving a measurement report associated with the positioning reference signal, wherein the measurement report is related to the accuracy level associated with the one or more timing measurements.

Example 27: The method of example 26, further comprising: scheduling one or more measurement gaps, one or more guard periods associated with a scheduled transmission of the positioning reference signal, or a combination thereof, wherein the one or more measurement gaps and the one or more guard periods are scheduled before the positioning reference signal, after the positioning reference signal, or any combination thereof, and wherein the accuracy level is based at least in part on scheduling the one or more measurement gaps, the one or more guard periods, or a combination thereof.

Example 28: The method of any of examples 26 or 27, further comprising: configuring the UE to bypass at least one portion of a transmit chain associated with the scheduled transmission of the positioning reference signal or a receive chain associated with a scheduled reception of a second positioning reference signal, wherein bypassing the at least one portion of the transmit chain or the receive chain is based at least in part on scheduling the one or more measurement gaps and the one or more guard periods.

Example 29: The method of any of examples 26 to 28, wherein the at least one portion of the transmit chain or the receive chain comprises a surface acoustic wave filter.

Example 30: The method of any of examples 26 to 28, wherein the positioning reference signal comprises an uplink positioning reference signal and the second positioning reference signal comprises a downlink positioning reference signal.

Example 31: The method of any of examples 26 to 30, further comprising: indicating, using the configuration signal, whether the positioning reference signal is intended for performing positioning measurements, performing communications, or any combination thereof.

Example 32: The method of any of examples 26 to 31, further comprising: indicating that the positioning reference signal is intended for performing the positioning measurements; and configuring the UE to bypass at least one portion of a transmit chain associated with a scheduled transmission of the positioning reference signal, wherein the accuracy level associated with the one or more timing measurements is based at least in part on bypassing the at least one portion of the transmit chain.

Example 33: The method of any of examples 26 to 32, wherein the positioning reference signal comprises a sounding reference signal.

Example 34: The method of any of examples 26 to 33, further comprising: indicating, using the configuration signal, whether the positioning reference signal is simultaneously transmitted with a channel, wherein the channel is in a same component carrier as the positioning reference signal or a different component carrier as the positioning reference signal.

Example 35: The method of any of examples 26 to 34, further comprising: indicating, using the configuration signal, whether a transmission power associated with the positioning reference signal satisfies a threshold.

Example 36: The method of any of examples 26 to 35, further comprising: receiving, from the UE, a UE capability associated with a frequency band, a combination of frequency bands, or both, wherein the threshold is based at least in part on the UE capability.

Example 37: The method of any of examples 26 to 36, further comprising: indicating, using the configuration signal, a duration of the positioning reference signal during a period of time, wherein the duration of the positioning reference signal comprises a number of symbols and the period of time comprises one millisecond.

Example 38: The method of any of examples 26 to 37, further comprising: indicating, using the configuration signal, a bandwidth associated with the positioning reference signal.

Example 39: The method of any of examples 26 to 38, further comprising: receiving, from the UE, a UE capability associated with a frequency band, a combination of frequency bands, or both, wherein a positioning reference signal bandwidth threshold is based at least in part on the UE capability.

Example 40: The method of any of examples 26 to 39, further comprising: indicating, using the configuration signal, a location of a sub-band associated with a scheduled transmission of the positioning reference signal, wherein an accuracy associated with the sub-band located at a center of a frequency band is greater than an accuracy associated with the sub-band located at an edge of the frequency band.

Example 41: The method of any of examples 26 to 40, further comprising: receiving, from the UE, a UE capability associated with the positioning reference signal, wherein the location of the sub-band associated with the scheduled transmission of the positioning reference signal is based at least in part on the UE capability.

Example 42: The method of any of examples 26 to 41, wherein the one or more timing measurements comprise a group delay timing measurement, a transmission timing measurement, a reception timing measurement, or any combination thereof, the group delay timing measurement being associated with a reception of the positioning reference signal and a transmission of a second positioning reference signal.

Example 43: The method of any of examples 26 to 42, wherein the accuracy level associated with the one or more timing measurements is different for a first frequency range and a second frequency range.

Example 44: An apparatus comprising at least one means for performing a method of any of examples 1 to 25.

Example 45: An apparatus for wireless communications comprising a processor; memory in electronic communication with the processor; and instructions stored in the memory and executable by the processor to cause the apparatus to perform a method of any of examples 1 to 25.

Example 46: A non-transitory computer-readable medium storing code for wireless communications, the code comprising instructions executable by a processor to perform a method of any of examples 1 to 25.

Example 47: An apparatus comprising at least one means for performing a method of any of examples 26 to 43.

Example 48: An apparatus for wireless communications comprising a processor; memory in electronic communication with the processor; and instructions stored in the memory and executable by the processor to cause the apparatus to perform a method of any of examples 26 to 43.

Example 49: A non-transitory computer-readable medium storing code for wireless communications, the code comprising instructions executable by a processor to perform a method of any of examples 26 to 43.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as any combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, by a user equipment (UE), comprising:
   receiving a configuration signal indicating a configuration for a first positioning reference signal;
   determining one or more properties associated with the first positioning reference signal;
   determining an accuracy level expected when performing one or more timing measurements based at least in part on one or more timings associated with the first positioning reference signal including a time difference between a reception of the first positioning reference signal and a transmission of a second positioning reference signal, and the one or more properties associated with the first positioning reference signal, wherein the accuracy level expected when performing the one or more timing measurements via a first frequency range is different from the accuracy level expected when performing the one or more timing measurements via a second frequency range, the accuracy level being non-proportional to a bandwidth associated with the first positioning reference signal; and transmitting a measurement report associated with the first positioning reference signal.

2. The method of claim 1, further comprising: determining an accuracy level associated with a transmission timing for the second positioning reference signal.

3. The method of claim 1, further comprising: determining one or more of an accuracy level associated with a reception timing for the first positioning reference signal, an accuracy level associated with the time difference between the reception of the first positioning reference signal and the transmission of the second positioning reference signal, or any combination thereof.

4. The method of claim 1, further comprising: identifying one or more measurement gaps, one or more guard periods associated with a scheduled transmission of the first positioning reference signal, or a combination thereof, wherein the one or more measurement gaps and the one or more guard periods are scheduled before the first positioning reference signal, after the first positioning reference signal, or any combination thereof; and
wherein determining the accuracy level further comprises determining the accuracy level based at least in part on identifying the one or more measurement gaps, the one or more guard periods, or a combination thereof.

5. The method of claim 4, further comprising: bypassing at least one portion of a transmit chain associated with the scheduled transmission of the first positioning reference signal or a receive chain associated with a scheduled reception of the second positioning reference signal, wherein identifying one or more timings associated with the second positioning reference signal comprises identifying one or more timing measurements associated with the second positioning reference signal, and bypassing the at least one portion of the transmit chain or the receive chain is based at least in part on identifying the one or more measurement gaps and the one or more guard periods.

6. The method of claim 5, wherein the at least one portion of the transmit chain or the receive chain comprises a surface acoustic wave filter.

7. The method of claim 5, wherein the first positioning reference signal comprises an uplink positioning reference signal and the second positioning reference signal comprises a downlink positioning reference signal.

8. The method of claim 1, further comprising: identifying, based at least in part on the configuration signal, whether the first positioning reference signal is intended for performing positioning measurements, performing communications, or any combination thereof, wherein the accuracy level expected when performing the one or more timing measurements is based at least in part on the identifying.

9. The method of claim 8, further comprising: identifying that the first positioning reference signal is intended for performing the positioning measurements; and
bypassing at least one portion of a transmit chain associated with a scheduled transmission of the first positioning reference signal, wherein the accuracy level expected when performing the one or more timing measurements is based at least in part on bypassing the at least one portion of the transmit chain.

10. The method of claim 8, further comprising: identifying that the first positioning reference signal is intended for performing the positioning measurements and the communications; and
determining a second accuracy level associated with the one or more timing measurements based at least in part on the identifying, wherein the accuracy level expected when performing the one or more timing measurements is greater than the second accuracy level associated with the one or more timing measurements.

11. The method of claim 8, wherein the first positioning reference signal comprises a sounding reference signal.

12. The method of claim 1, further comprising: identifying, based at least in part on the configuration signal, whether the first positioning reference signal is simultaneously transmitted with a channel, wherein the channel is in a same component carrier as the first positioning reference signal or a different component carrier as the first positioning reference signal, wherein the accuracy level expected when performing the one or more timing measurements is based at least in part on the identifying.

13. The method of claim 1, further comprising: identifying, based at least in part on the configuration signal, whether a transmission power associated with the first positioning reference signal satisfies a threshold, wherein the accuracy level expected when performing the one or more timing measurements is based at least in part on the identifying.

14. The method of claim 13, further comprising: identifying that the transmission power associated with the first positioning reference signal satisfies the threshold; and
bypassing at least one portion of a transmit chain associated with a scheduled transmission of the first positioning reference signal, wherein the accuracy level expected when performing the one or more timing measurements is based at least in part on bypassing the at least one portion of the transmit chain.

15. The method of claim 13, further comprising: identifying that the transmission power associated with the first positioning reference signal does not satisfy the threshold; and
determining a second accuracy level associated with the one or more timing measurements based at least in part on the identifying, wherein the accuracy level expected when performing the one or more timing measurements is greater than the second accuracy level associated with the one or more timing measurements.

16. The method of claim 13, further comprising: reporting, to a network entity, a UE capability associated with a frequency band, a combination of frequency bands, or both, wherein the threshold is based at least in part on the UE capability.

17. The method of claim 1, further comprising: identifying, based at least in part on the configuration signal, a duration of the first positioning reference signal during a period of time;
determining whether the duration of the first positioning reference signal satisfies a threshold; and
bypassing, based at least in part on determining that the duration of the first positioning reference signal satisfies the threshold, at least one portion of a transmit chain associated with a scheduled transmission of the first positioning reference signal, wherein the accuracy level expected when performing the one or more timing measurements is based at least in part on bypassing the at least one portion of the transmit chain.

18. The method of claim 17, wherein the duration of the first positioning reference signal comprises a number of symbols and the period of time comprises one millisecond.

19. The method of claim 1, further comprising:
identifying, based at least in part on the configuration signal, bandwidth associated with the first positioning reference signal; and
determining that the bandwidth associated with the first positioning reference signal satisfies a positioning reference signal bandwidth threshold.

20. The method of claim 19, further comprising:
reporting, to a network entity, a UE capability associated with a frequency band, a combination of frequency bands, or both, wherein the positioning reference signal bandwidth threshold is based at least in part on the UE capability.

21. The method of claim 1, further comprising:
identifying, based at least in part on the configuration signal, a location of a sub-band associated with a scheduled transmission of the first positioning reference signal, wherein the accuracy level expected when performing the one or more timing measurements is based at least in part on the location of the sub-band.

22. The method of claim 21, wherein an accuracy associated with the sub-band located at a center of a frequency band is greater than an accuracy associated with the sub-band located at an edge of the frequency band.

23. The method of claim 21, further comprising:
reporting, to a network entity, a UE capability associated with the first positioning reference signal, wherein the location of the sub-band associated with the scheduled transmission of the first positioning reference signal is based at least in part on the UE capability.

24. The method of claim 1, further comprising:
determining a second configuration for the second positioning reference signal;
determining one or more properties associated with the second positioning reference signal based at least in part on the second configuration; and
determining a second accuracy level associated with the timing difference between the reception of the first positioning reference signal and the transmission of the second positioning reference signal, wherein a timing of reception of the first positioning reference signal is based at least in part on identifying the one or more timing measurements associated with the first positioning reference signal, and wherein the measurement report is related to the second accuracy level.

25. The method of claim 1, wherein the one or more timing measurements comprise a group delay timing measurement, a transmission timing measurement, a reception timing measurement, or any combination thereof, the group delay timing measurement being associated with a reception of the first positioning reference signal and a transmission of the second positioning reference signal.

26. The method of claim 1, wherein the measurement report is related to the accuracy level associated with the one or more timing measurements.

27. The method of claim 1, wherein the accuracy level associated with the one or more timing measurements is for a specific frequency range.

28. A method for wireless communication, comprising:
transmitting, to a user equipment (UE), a configuration signal indicating a configuration for a first positioning reference signal;
indicating one or more properties associated with the first positioning reference signal using the configuration signal, wherein an accuracy level expected when performing one or more timing measurements via a first frequency range is different from the accuracy level expected when performing the one or more timing measurements via a second frequency range, the accuracy level being non-proportional to a bandwidth associated with the first positioning reference signal; and
receiving a measurement report associated with the first positioning reference signal.

29. The method of claim 28, further comprising:
scheduling one or more measurement gaps, one or more guard periods associated with a scheduled transmission of the first positioning reference signal, or a combination thereof, wherein the one or more measurement gaps and the one or more guard periods are scheduled before the first positioning reference signal, after the first positioning reference signal, or any combination thereof, and wherein the accuracy level is based at least in part on scheduling the one or more measurement gaps, the one or more guard periods, or a combination thereof.

30. The method of claim 29, further comprising:
configuring the UE to bypass at least one portion of a transmit chain associated with the scheduled transmission of the first positioning reference signal or a receive chain associated with a scheduled reception of a second positioning reference signal, wherein bypassing the at least one portion of the transmit chain or the receive chain is based at least in part on scheduling the one or more measurement gaps and the one or more guard periods.

* * * * *